United States Patent [19]

Haseda et al.

[11] Patent Number: 5,089,967

[45] Date of Patent: Feb. 18, 1992

[54] AUXILIARY STEERING SYSTEM ASSOCIATED WITH ANTI-SKID CONTROL SYSTEM FOR USE IN MOTOR VEHICLE

[75] Inventors: Satoshi Haseda; Shinji Hiraiwa, both of Okazaki; Youzou Majima, Kariya; Fumiaki Murakami, Kariya; Masatoshi Kuroyanagi, Kariya; Takaji Murakawa, Kariya, all of Japan

[73] Assignee: Nippondenso Co., Ltd., Kariya, Japan

[21] Appl. No.: 569,579

[22] Filed: Aug. 20, 1990

Related U.S. Application Data

[63] Continuation of Ser. No. 230,743, Aug. 10, 1988, abandoned.

[30] Foreign Application Priority Data

Aug. 10, 1987 [JP] Japan .................. 62-200305
Sep. 10, 1987 [JP] Japan .................. 62-226991
Nov. 17, 1987 [JP] Japan .................. 62-290323
Dec. 26, 1987 [JP] Japan .................. 62-331033

[51] Int. Cl.⁵ .................................... B60T 8/62
[52] U.S. Cl. .................... 364/426.02; 364/424.05; 303/93; 303/100; 180/197
[58] Field of Search .............. 364/426.02, 424.05; 303/93, 95, 100, 103, 104; 180/197, 6.2, 6.62, 79.1

[56] References Cited

U.S. PATENT DOCUMENTS

| | | | |
|---|---|---|---|
| 4,313,166 | 1/1982 | Rode et al. ............... | 364/426.02 |
| 4,718,736 | 1/1988 | Fennel et al. ............. | 364/426.02 |
| 4,754,824 | 7/1988 | Olsson ..................... | 180/6.2 |
| 4,794,539 | 12/1988 | Wallentowitz et al. ..... | 303/100 |
| 4,800,498 | 1/1989 | Matsui et al. ............. | 364/426.02 |
| 4,809,181 | 2/1989 | Ito et al. ................. | 364/426.01 |
| 4,878,557 | 11/1989 | Shibahata et al. ......... | 180/140 |

FOREIGN PATENT DOCUMENTS

| | | |
|---|---|---|
| 0231113 | 8/1987 | European Pat. Off. . |
| 164460 | 9/1983 | Japan . |
| 50902 | 11/1983 | Japan . |
| 19863 | 5/1984 | Japan . |
| 161256 | 8/1985 | Japan . |
| 44186 | 10/1985 | Japan . |
| 113006 | 7/1986 | Japan . |
| 235275 | 10/1986 | Japan . |
| 4679 | 1/1987 | Japan . |
| 8872 | 1/1987 | Japan . |
| 20758 | 1/1987 | Japan . |
| 71761 | 4/1987 | Japan . |
| 131880 | 6/1987 | Japan . |
| 131881 | 6/1987 | Japan . |
| 173372 | 7/1987 | Japan . |

Primary Examiner—Parshotam S. Lall
Assistant Examiner—V. Trans
Attorney, Agent, or Firm—Cushman, Darby & Cushman

[57] ABSTRACT

An auxiliary steering control system in connection with an anti-skid control system for use in a motor vehicle with two parts of left and right wheels, the anti-skid control system being adapted to independently control braking pressures for at least one pair of left and right wheels and including a braking actuator for adjusting braking pressures to be applied to the pair of left and right wheels. The braking actuator is controlled so that the braking pressures therefor approach the target braking forces determined on the basis of the rotational speeds of the wheels. The steering control device includes a steering actuator for adjusting steering angles of the pair of left and right wheels in response to steering control signals from a steering angle control unit. The steering control unit determines the steering angles of the pair of left and right wheels on the basis of the difference between the braking pressures therefor and outputs the steering control signals thereto so that the pair of left and right wheels assume the determined steering angles.

19 Claims, 24 Drawing Sheets

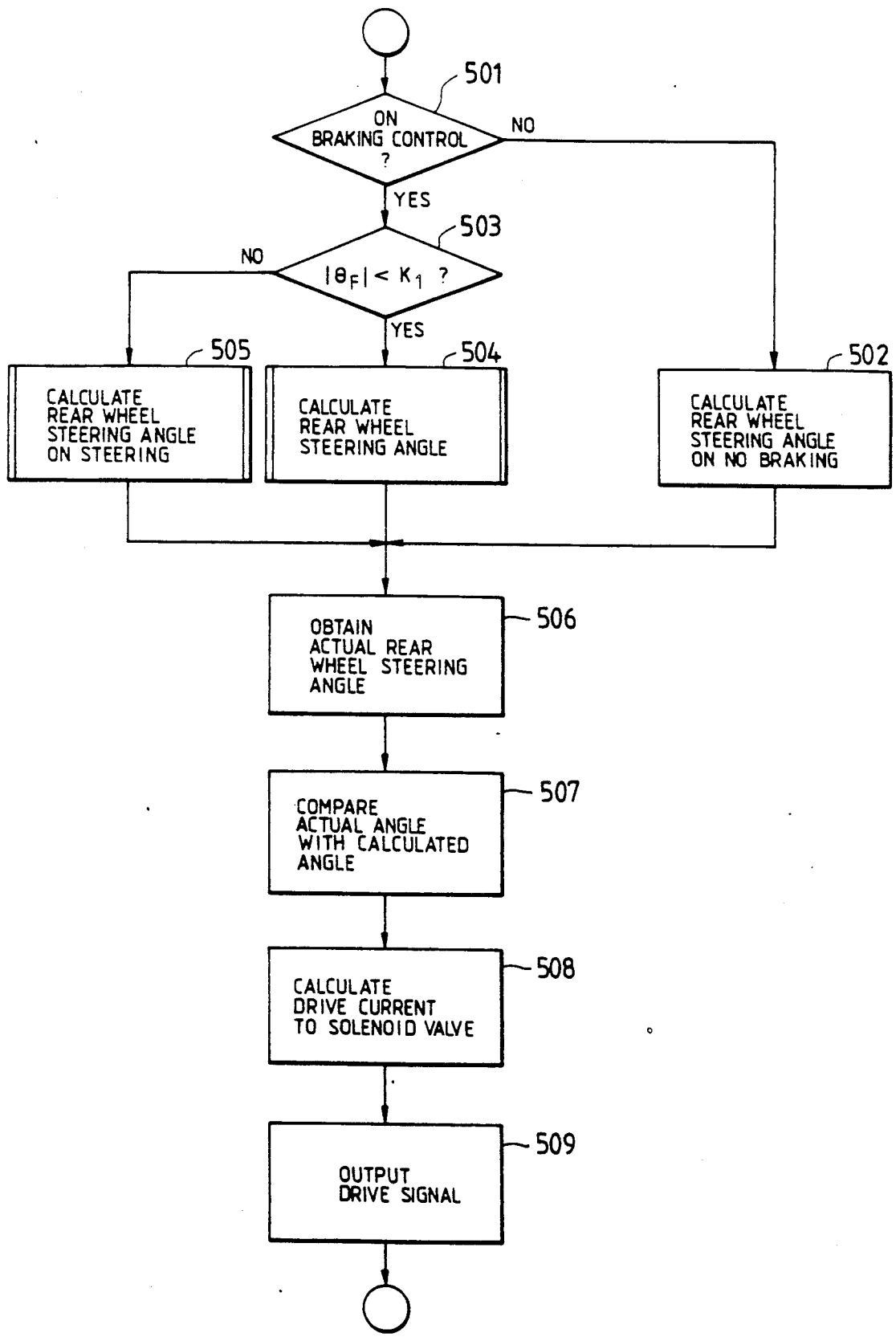

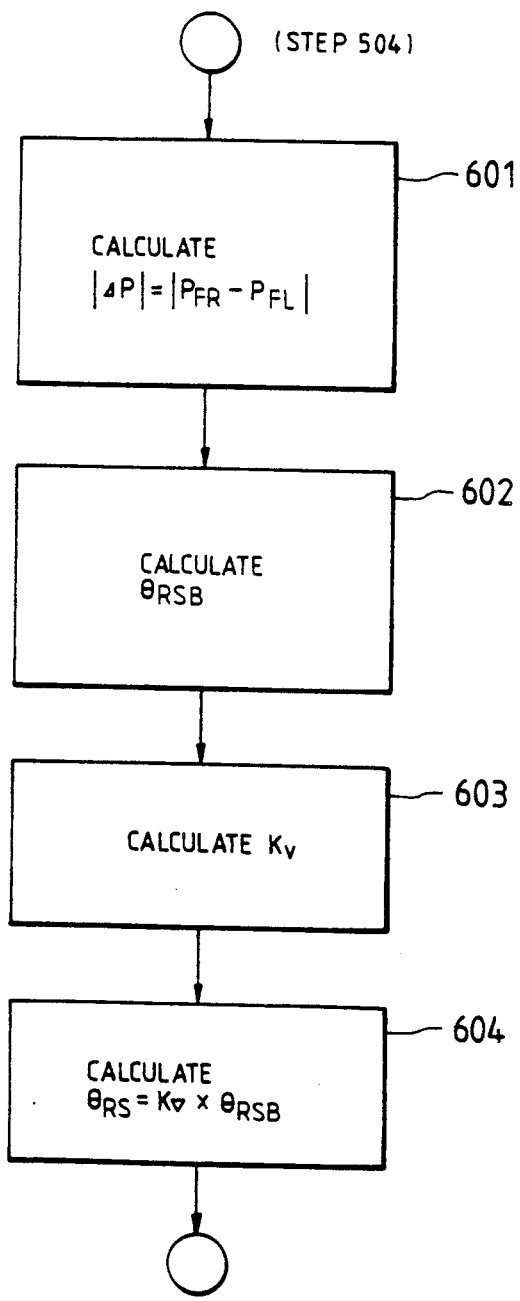

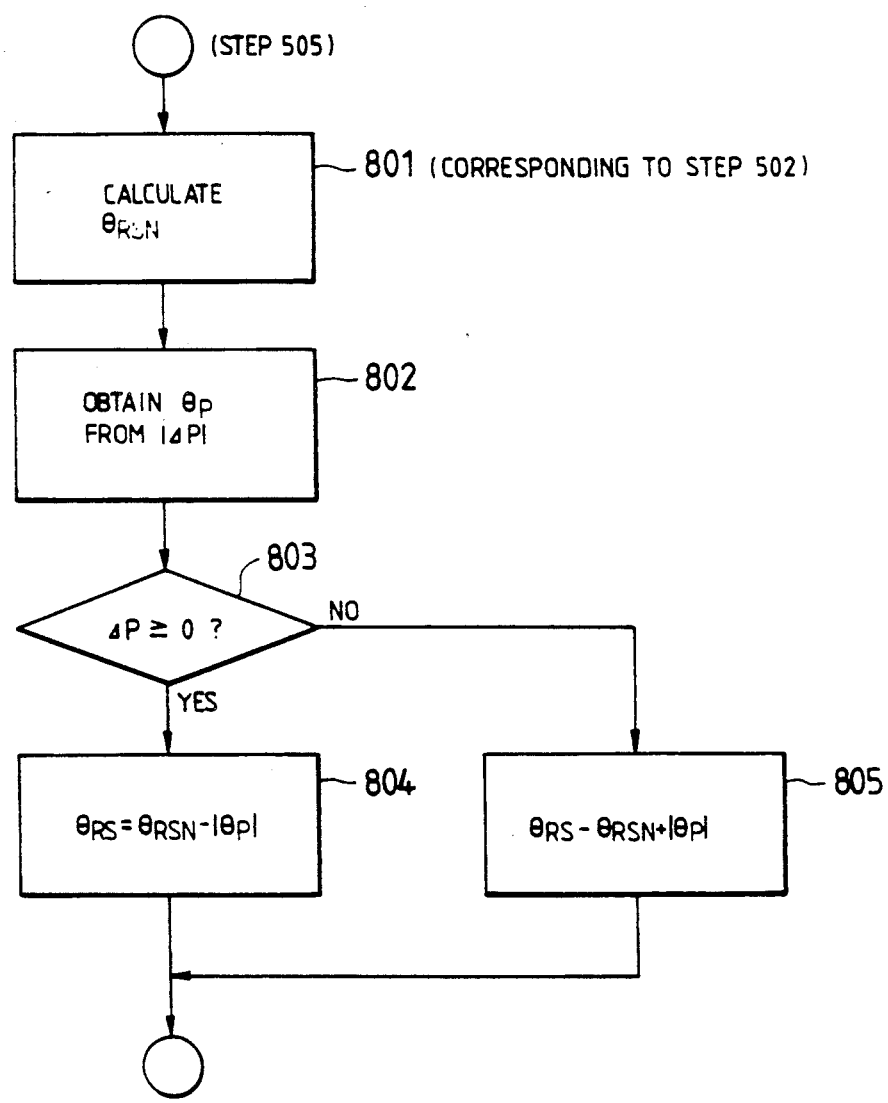

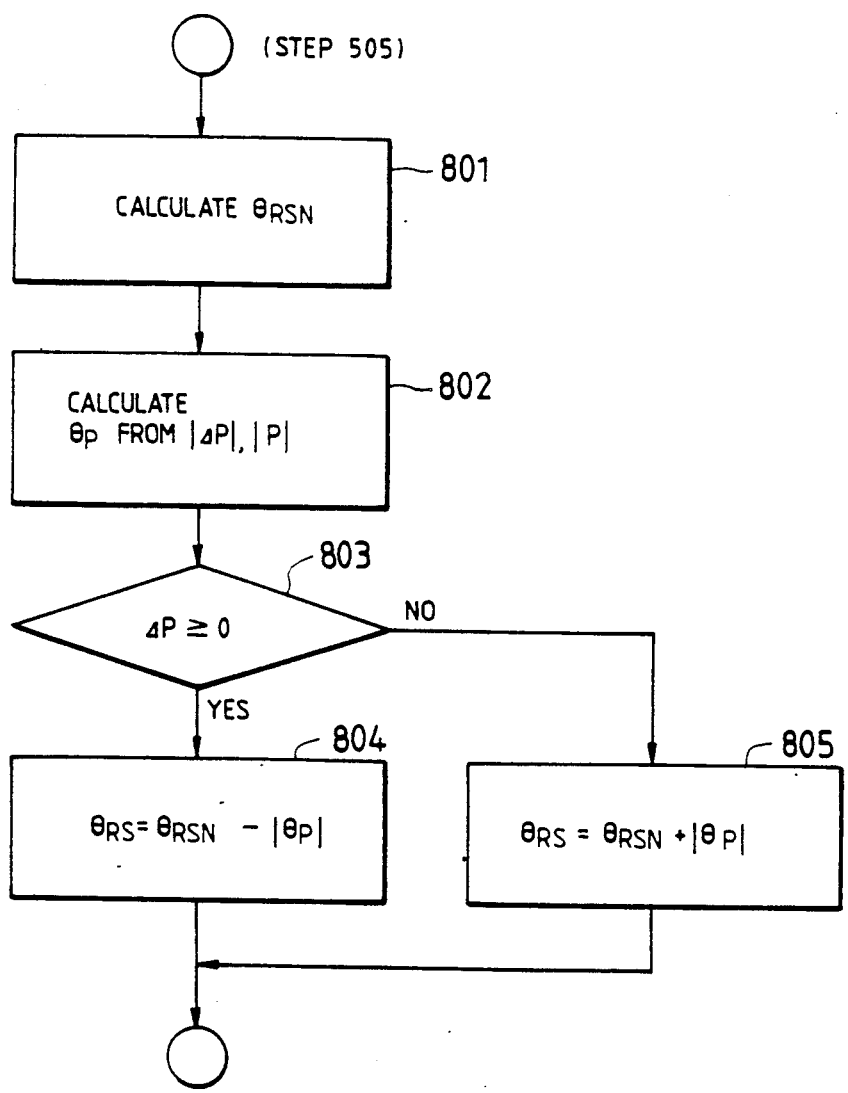

AUXILIARY STEERING SYSTEM ASSOCIATED WITH ANTI-SKID CONTROL SYSTEM FOR USE IN MOTOR VEHICLE

This is a continuation of application Ser. No. 07/230,743, filed on Aug. 10, 1988, now abandoned.

BACKGROUND OF THE INVENTION

The present invention relates generally to auxiliary steering systems for adjusting the steering angles of the front or rear wheels of a motor vehicle, and more particularly to such an auxiliary steering system operable in connection with an anti-skid control system which independently performs the braking control for at least either the front-side right and left wheels or rear-side right and left wheels of the motor vehicle.

Anti-skid control systems are generally known as systems for controlling the braking hydraulic pressures to braking devices for the wheels of a motor vehicle so as to prevent the wheels from being locked and slipped in response to braking operation by the vehicle driver. An important problem in anti-skid control systems of the type that the braking control is effected independently for the right and left wheels relates to the fact that the braking hydraulic pressures for the right and left wheels are different from each other due to the difference between the friction coefficients $\mu$ of the road surfaces coming into contact with the right and left wheels. This causes generation of a yawing moment with respect to the motor vehicle, thereby resulting in the motor vehicle being apt to be deflected toward the high $\mu$ road. One known approach for elimination of this problem, such as is disclosed in Japanese Patent Provisional Publication No. 58-164460, is that in order to prevent the generation of the yawing moment the braking pressure for the wheel on the high $\mu$ road surface is controlled in accordance with the braking pressure for the wheel on the low $\mu$ road surface. However, this approach causes deterioration of the anti-skid control function and hence lengthens the braking distance of the motor vehicle. Another attempt, as disclosed in the Japanese patent Provisional Publication No. 60-161256, is to perform the auxiliary steering control of the wheels on the basis of detection of the lateral acceleration or yaw rate of the motor vehicle. Similarly, there is a problem which arises with such an attempt, however, in that specific sensors are required to detect the lateral acceleration or yaw rate and further it is not effective to perform the auxiliary steering control after the detection thereof because of resulting in delay of the execution of the steering control in practice.

SUMMARY OF THE INVENTION

The present invention has been developed in order to remove the above-mentioned drawbacks inherent to the conventional techniques.

It is therefore an object of the present invention to provide an auxiliary steering control system which is capable of appropriately and effectively controlling the wheel steering in response to a rapid braking operation under the condition that the motor vehicle is running on a road with different friction coefficients with respect to the right and left wheels.

One feature of the present invention is to determine the steering angles of at least one pair of left and right wheels of a motor vehicle on the basis of the information relating to the braking pressures therefor due to the anti-skid control.

Thus, a control system for use in a motor vehicle according to the present invention comprises a steering control device for controlling the steering angles of at least one pair of left and right wheels in connection with the braking control performed by an anti-skid control device for independently controlling braking pressures for the pair of left and right wheels. The anti-skid control device includes braking actuator means for adjusting braking pressures to be applied to the pair of left and right wheels and wheel sensor means for sensing rotational speeds of the pair of left and right wheels so as to determine target braking pressures for the pair of left and right wheels on the basis of the sensed rotational speed signals and cause the braking pressures for the pair of left and right wheels to assume the determined target braking pressures, respectively. The steering control device determines the steering angles of the pair of left and right wheels on the basis of the information relating to braking pressures therefor and controls steering actuator means so that the pair of left and right wheels assume the determined steering angles.

Preferably, the control system further includes braking pressure sensor means for sensing braking forces applied to the pair of left and right wheels and the steering control device determines the steering angles thereof on the basis of the difference between the braking pressures sensed by the braking pressure sensor means. It is also appropriate that the steering control device determines the steering angles of the pair of left and right wheels on the basis of the difference between the target braking pressures determined in the antiskid control.

Still preferably, the control system further includes vehicle speed detection means for detecting a speed of the motor vehicle and the steering control device corrects the steering angles thereof on the basis of the detected vehicle speed.

BRIEF DESCRIPTION OF THE DRAWINGS

The object and features of the present invention will become more readily apparent from the following detailed description of the preferred embodiments taken in conjunction with the accompanying drawings in which:

FIG. 6 is a flow chart showing the processes of the wheel steering control;

FIG. 7 is a flow chart for describing the detail of a step of the FIG. 6 flow chart;

FIG. 9 is a flow chart showing the detail of another step of the FIG. 6 flow chart;

FIG. 16 is a flow chart showing the steering control;

FIG. 17A shows the relation between the steering angle and the braking pressure;

DETAILED DESCRIPTION OF THE INVENTION

Figure 1:
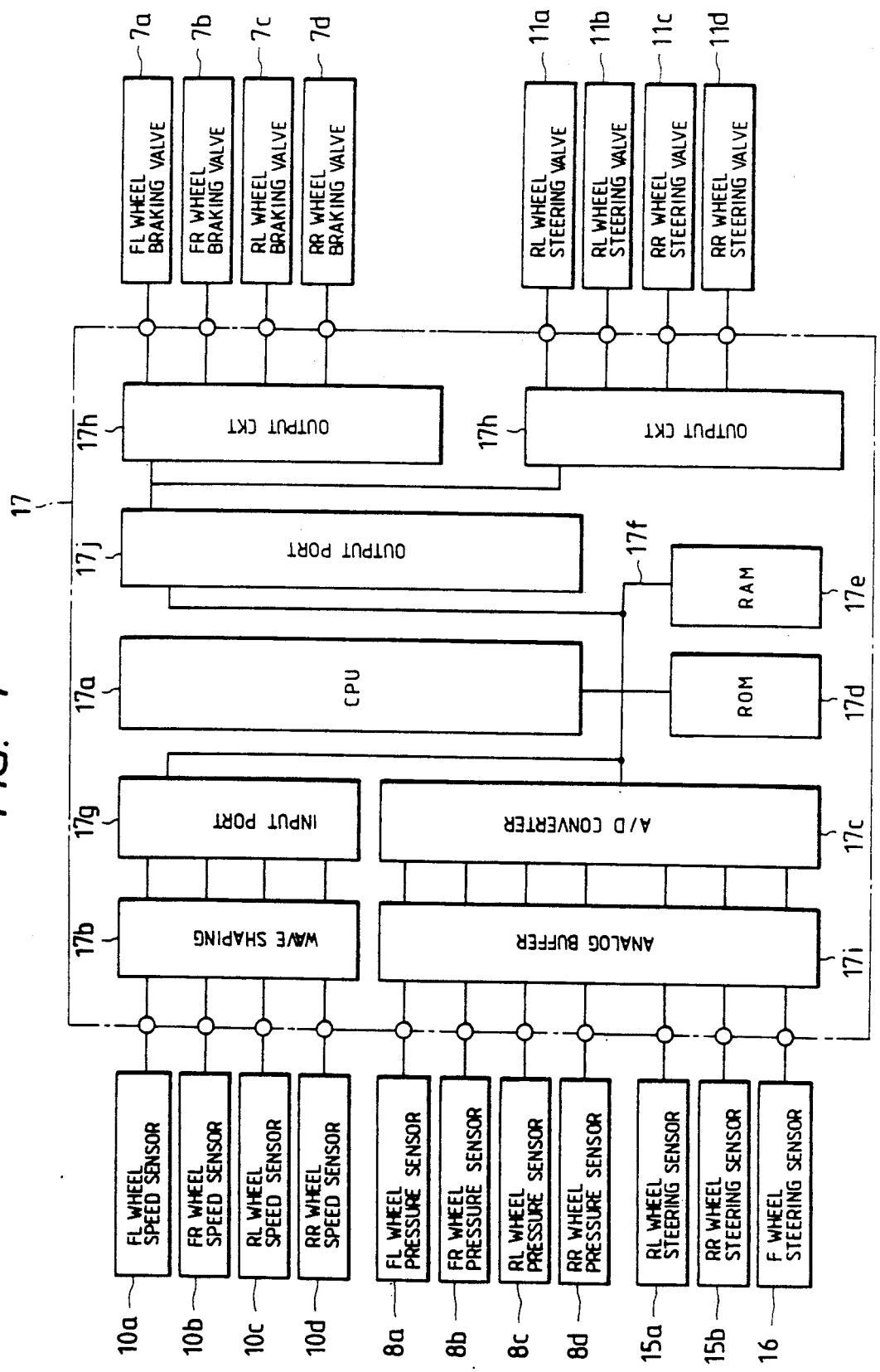
FIG. 1 is a block diagram principally showing the entire arrangement of an electronic control unit used in a control system according to the present invention.

A first embodiment of the present invention will be described hereinbelow with reference to FIGS. 1 through 10. FIG. 1 is a block diagram principally showing the entire arrangement of an electronic control unit (ECU) 17 and its associated devices for execution of anti-skid control and auxiliary steering control. In FIG. 1, the electronic control unit 17 is provided with a microcomputer which includes a central processing unit (CPU) 17a for performing the control in accordance with programmed instructions and using various data necessary for the control execution. Signals to and from the CPU 17a are carried along a common bus 17f to which are coupled the associated units including a read-only memory (ROM) 17d, a random access memory (RAM) 17e, an input port 17g and an analog-to-digital (A/D) converter 17c. The input port 17g is coupled through a waveshaping circuit 17b to wheel speed sensors 10a to 10d for respectively sensing the speeds of the front-left (FL) wheel, front-right (FR) wheel, rear-left (RL) wheel and rear-right (RR) wheel so as to input voltage pulse signals indicative of wheels speeds thereform in the microcomputer after waveshaping. The A/D converter 17c is coupled through an analog buffer 17i to braking pressure sensors 8a to 8d and steering angle sensors 15a, 15b, 16 for respectively sensing the steering angles of the FL to RR wheels so as to input signals indicative of braking pressures and steering angles therefrom in the microcomputer after analog-to-digital conversion. Also included as the associated units in the microcomputer is an output port 17j for outputting instructions from the CPU 17a which is coupled through an output circuit 17h to braking pressure control solenoid valves (two-position solenoid valves) 7a to 7d and further coupled through another output circuit 17h to steering control solenoid valves (three-position solenoid valves) 11a to 11d. The output circuits 17h supply exciting currents to the exciting coils of the respective solenoid valves 7a to 7d and 11a to 11d in accordance with the instructions signals from the output port 17j.

Figure 2:
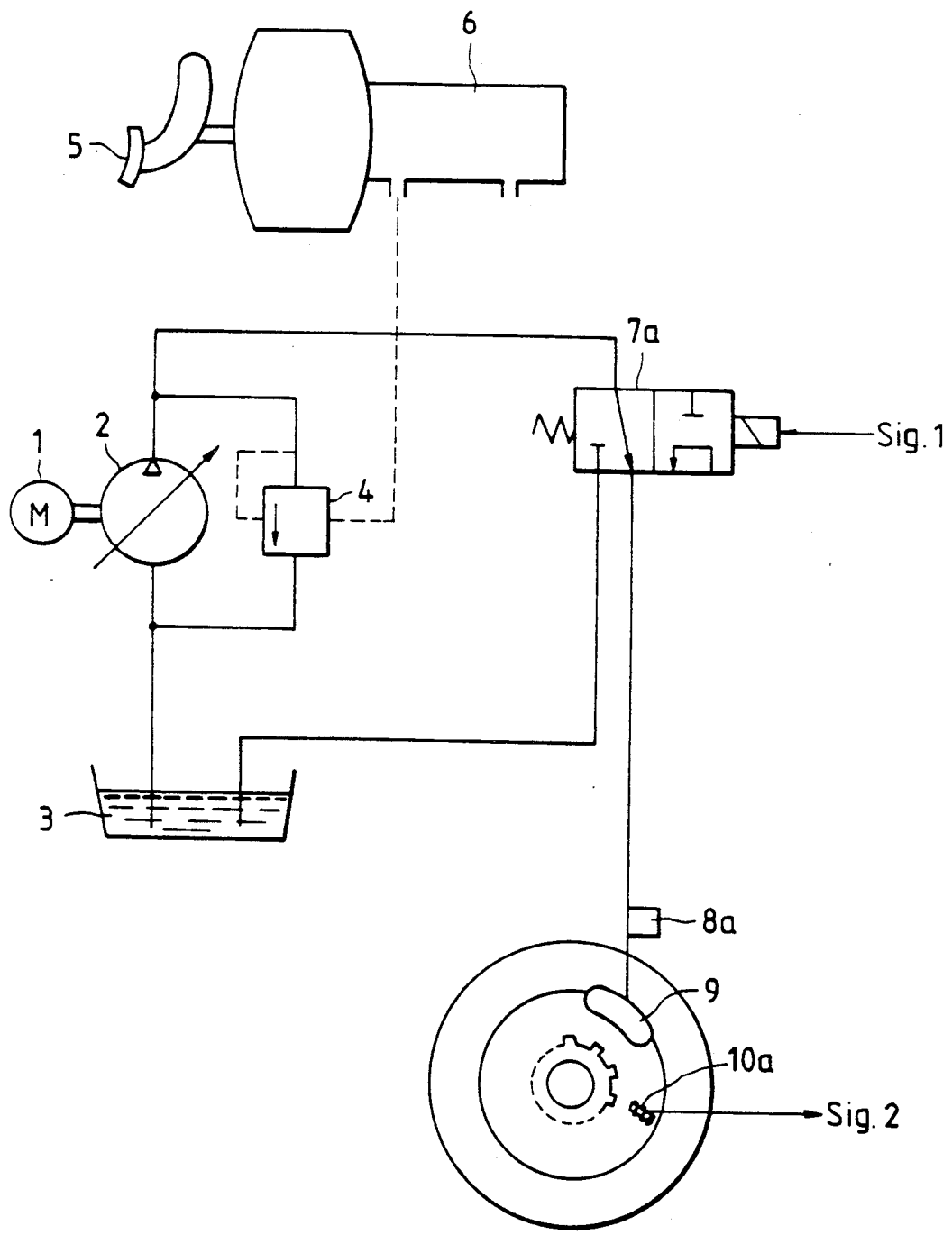
FIG. 2 is an illustration of a braking hydraulic pressure control apparatus for anti-skid control.

Anti-skid control for four wheels will be described hereinbelow with reference to FIG. 2, which shows a braking pressure control apparatus for only the front-left (FL) wheel because the arrangements of the braking control apparatus for the four wheels are equal to each other. In FIG. 2, between the inlet and outlet of a hydraulic pressure pump 2 driven by a motor 1 is provided a change-over valve 4 for switching the relation therebetween from the communicating state to the cut-off state and keeping the cut-off state by means of the hydraulic pressure from a braking master cylinder 6 operated in response to depression of a braking pedal 5 by the vehicle driver, whereby the hydraulic pressure of the pump 2 follows the hydraulic pressure of the master cylinder 6. That is, the change-over valve 4 is opened and closed so that the discharging pressure of the pump 2 becomes equal to the hydraulic pressure of the master cylinder 6. The outlet of the hydraulic pressure pump 2 is also coupled through the three-port two-position solenoid valve 7a for braking pressure control to a wheel cylinder 9. In response to deenergization of the two-position solenoid valve 7a, the outlet of the hydraulic pressure pump 2 and the wheel cylinder 9 are kept to the communicating state and, whereas, in response to energization thereof, the wheel cylinder 9 is communicated with a reservoir 3. The switching of two-position solenoid valve 7a is controlled in accordance with a duty ratio signal Sig1 from the electronic control unit 17. Reference 8a is a braking pressure sensor made up of a semiconductor pressure sensor or the like for detecting the braking pressure, i.e., the hydraulic pressure applied to the wheel cylinder 9.

Figure 3:
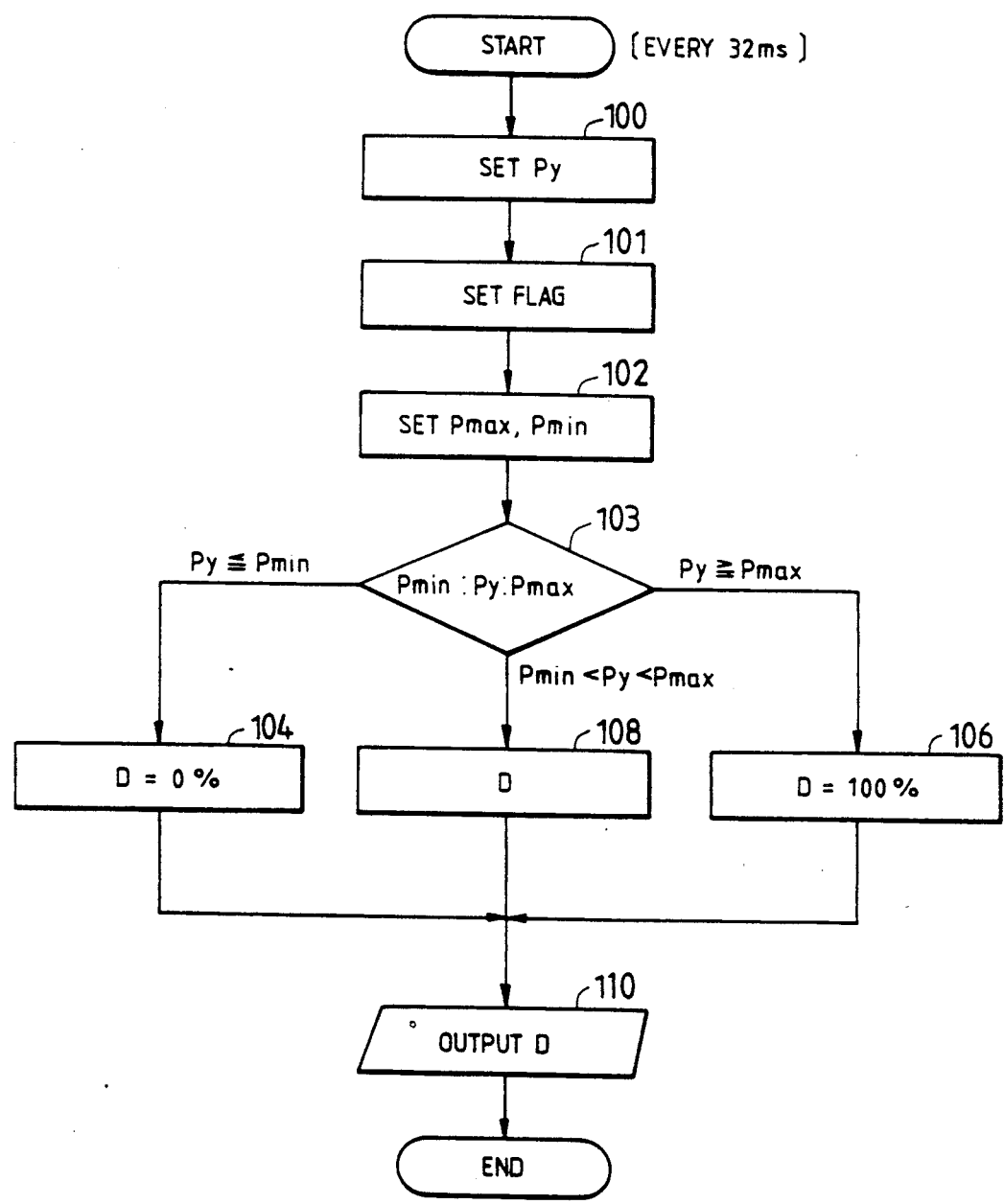
FIG. 3 is a flow chart for describing the anti-skid control which is performed for each of the wheels.

FIG. 3 is a flow chart for describing the anti-skid control which is executed independently for the respective wheels at a predetermined interval (for example, 32 ms) so that the respective wheels assume the optimal slip ratios.

The ECU first executes a step 100 in which a target value Py of the braking hydraulic pressure is set for each of the wheels. The target hydraulic pressure value Py for each of the wheels is determined as follows on the basis of the voltage signal Sig2 from each of the wheel speed sensors 10a to 10d (see FIG. 2) and a reference value prestored in the ROM 17d.

$$Wp = K1 \cdot (Vw - V_B + K2) + K3 \cdot (\dot{V}w - \dot{V}_B) \tag{1}$$

$$P_{MED(n)} = P_{MED(n-1)} + K4 \cdot Wp \tag{2}$$

$$Py = P_{MED(n)} + K5 \cdot Wp \tag{3}$$

where $V_B$ represents a vehicle speed, Vw designates a wheel speed and K1, K2, K3, K4, K5 are constants, and Wp and $P_{MED}$ are parameters for determining Py.

The vehicle speed $V_B$ may be estimated from the wheel speed Vw or obtained directly using a vehicle speed sensor. In a subsequent step 101, a flag is set in order to indicate that the vehicle is under the braking control.

A step 102 is then executed in order to obtain Pmax, Pmin on the basis of the present hydraulic pressure Px. Here, Pmax is an estimated hydraulic pressure value to be obtained at the end of period in the case of duty ratio of 100%, i.e., in the case that a command signal indicative of only pressure-increasing is outputted to the two-position solenoid valve 7a, 7b, 7c or 7d. Pmin is an estimated hydraulic pressure value to be obtained at the end of period in the case of duty ratio of 0%, i.e., in the case that a command signal indicative of only pressure-decreasing is outputted thereto.

Figure 4:
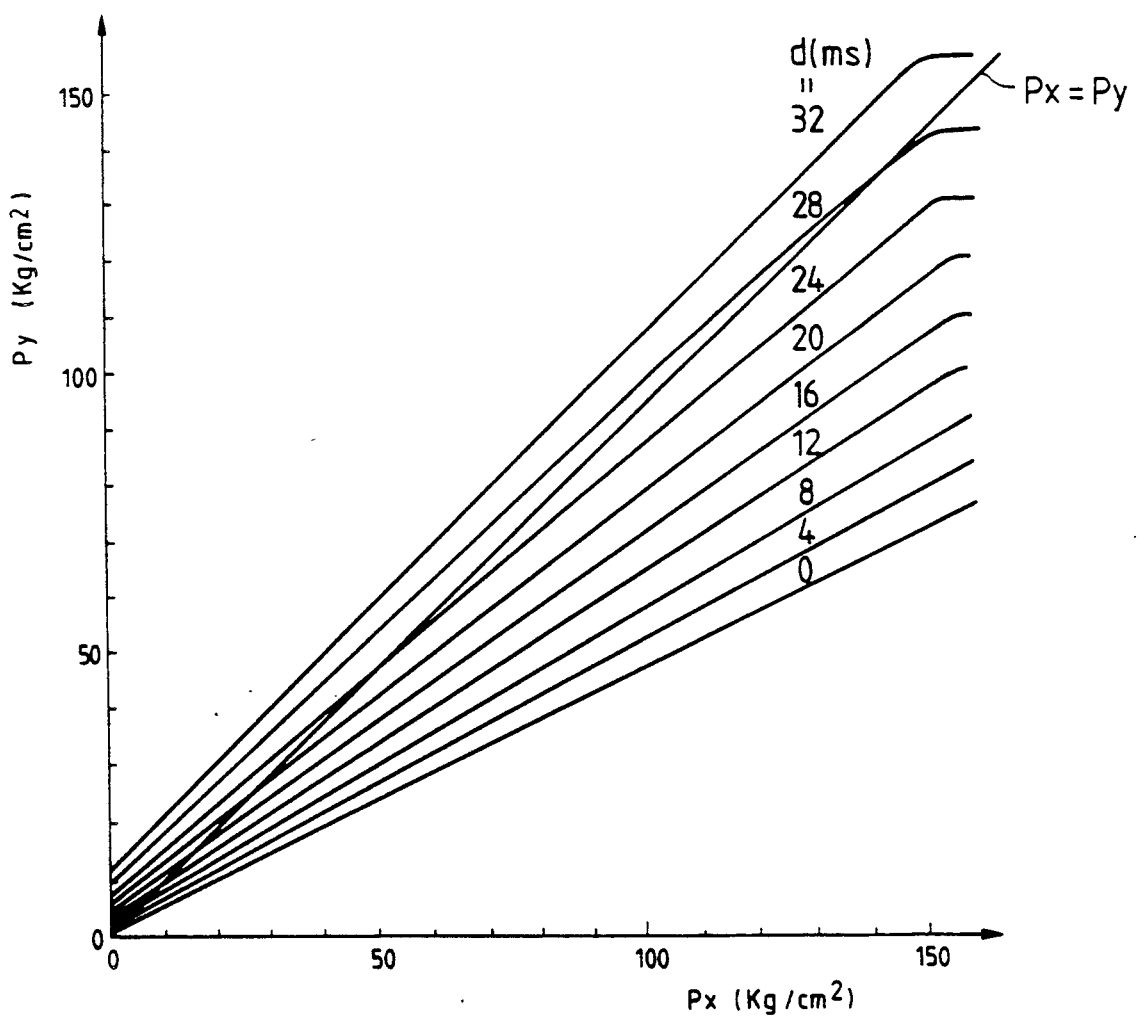
FIG. 4 is a graphic illustration used for determining the duty ratio to be supplied to the braking hydraulic pressure control apparatus.

In a step 103, the target hydraulic pressure Py is compared in magnitude with the estimated hydraulic pressure values Pmax and Pmin. If Py≦Pmin, in a step 104, the duty ratio D is set to 0% indicating only pressure-decreasing. If Py≧Pmax, in a step 106, the duty ratio D is set to 100% indicating only pressure-increasing. Furthermore, if Pmin<Py<Pmax, in a step 108, the duty ratio D is determined in accordance with a map as shown in FIG. 4 (if required, an interpolation calculation is added). In FIG. 4, reference d represents the pressure-increasing time of one period (32 ms), that is, the duty ratio D is determined as D=100·d/32. Here, the equation corresponding to the FIG. 4 map is as follows:

$$Py = (Px + 0.344d) \cdot 0.5e0.0217d$$

Finally, in a step 110, an exciting current pulse corresponding to the duty ratio D determined in the step 104, 106 or 108 is supplied to the two-position solenoid valve 7a, 7b, 7c or 7d.

Figure 5:
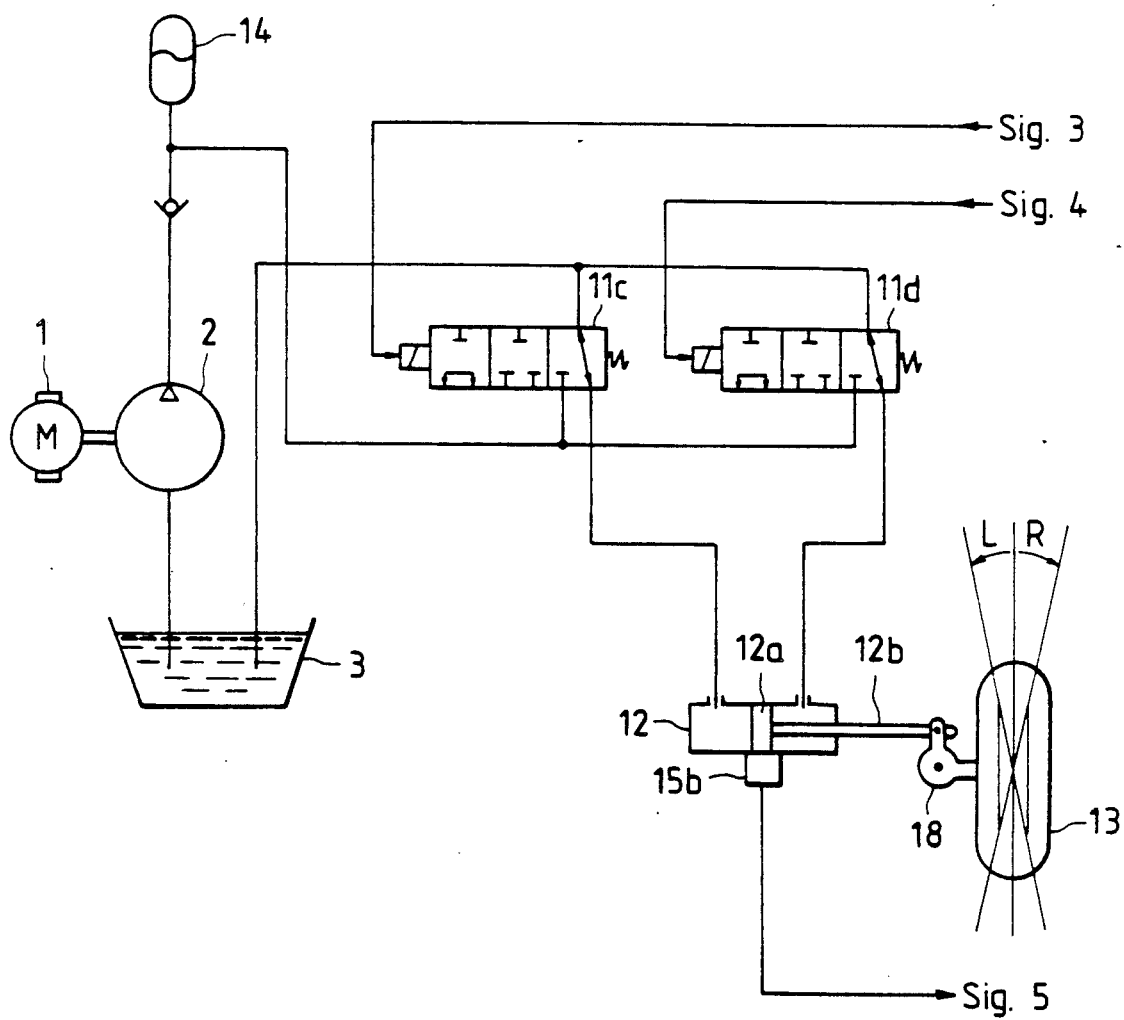
FIG. 5 shows an arrangement of a wheel steering control apparatus.

FIG. 5 schematically shows an arrangement of the steering control apparatus for only the rear-right wheel. This apparatus includes an accumulator 14 for accumulating a high hydraulic pressure produced by a hydraulic pressure pump 2 driven by a motor 1, and the high pressure oil in the accumulator 14 is supplied through two three-port three-position solenoid valves (rear wheel steering control solenoid valves) 11c and 11d into a rear wheel steering actuator 12. The steering actuator 12 comprises a cylinder in which a piston 12a is encased so as to form two chambers which are coupled to the two steering control solenoid valves 11c and 11d, respectively, whereby the piston 12a is linearly movable in the right and left directions in FIG. 5 in accordance with the hydraulic pressures from the two steering control solenoid valves 11c and 11d or kept to a predetermined position. The piston 12a is connected through a piston rod 12b to a knuckle arm 18 and the linear movement in the cylinder of the steering actuator 12 causes rotations of the rear right wheel 13 in the left and right directions as shown in FIG. 5. The steering angle sensor 15b is attached to the steering actuator 12 in order to detect the position of the piston 12a, thereby sensing the rotational angle, i.e., steering angle, of the rear right wheel 13. References Sig3 and Sig4 represent signals supplied from the electronic control unit 17 so as to energize the exciting coils of the solenoid valves 11c and 11d and reference Sig5 designates a signal indicative of the steering angle of the rear right wheel 13 which is inputted to the electronic control unit 17.

Figure 10:
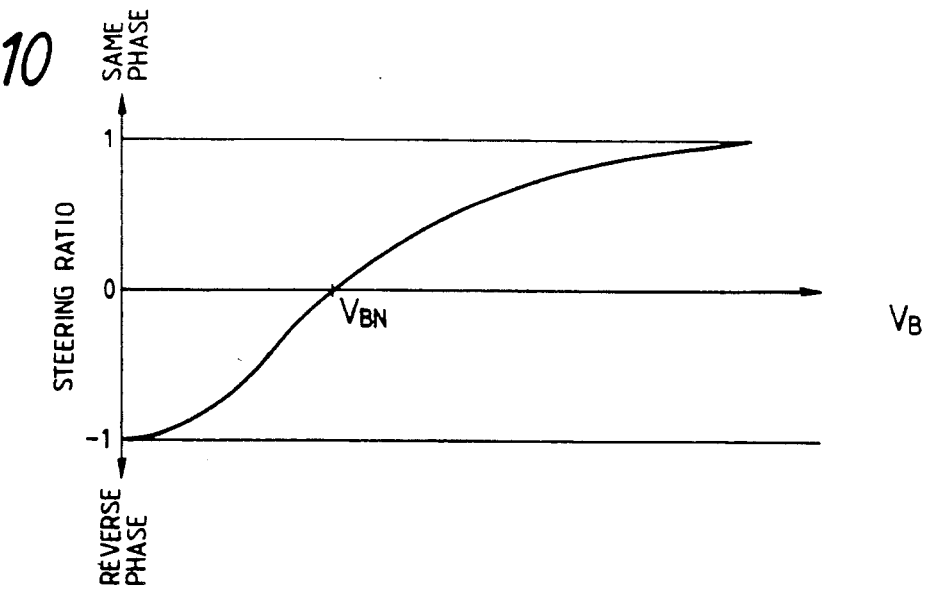
FIG. 10 is a graphic diagram showing the relation between the steering angle ratio of the front and rear side wheels and the vehicle speed.

The rear wheel steering control will be described hereinbelow with reference to a flow chart of FIG. 6. The execution of steps of the flow chart is effected at a predetermined interval, for example, 8 ms. The control starts with a step 501 in which it is checked whether the motor vehicle is on the braking control (four wheel anti-skid control). This decision is made in accordance with the flag in the step 101 in FIG. 3. If not, a step 502 follows to perform known rear wheel steering control where a rear wheel steering angle (which will be referred to as $\theta_{RSN}$) is calculated on the basis of the steering information from the front wheel steering sensor 16 and the vehicle speed which may be derived as a function of the wheel speed information from the wheel speed sensors 10a to 10d. Here, $\theta_{RSN}$ is a vector value. For example, as disclosed in Japanese Patent publication No. 60-44185 and as illustrated in FIG. 10, in the range that the vehicle speed exceeds a predetermined speed $V_{BN}$, the rear wheels are set to be in phase with the front wheels, and in accordance with increase in the vehicle speed, the rear wheel steering angle is calculated on the basis of the front wheel steering information and the vehicle speed so that the steering ratio, being the ratio of the rear wheel steering angle to the front wheel steering angle, becomes closer to 1. On the other hand, in the case that the vehicle speed is below $V_{BN}$, the rear wheels are set to be reverse phase with the front wheels, and in accordance with decrease in the vehicle speed, the steering angles of the rear wheels are calculated so that the steering ratio becomes closer to −1. In FIG. 10, in the case that the phase is coincident, $\theta_{RSN}$ assumes a positive value, and in the case of the reverse phase, it assumes a negative value. The step 502 is followed by a step 506 which will be described hereinafter.

Figure 8A:
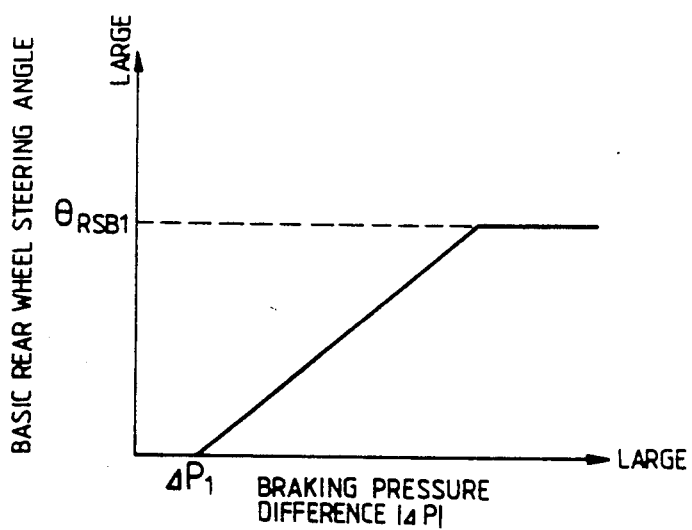
FIG. 8A is a graphic illustration for describing the relation between the basic rear wheel steering angle and the braking pressure difference between a pair of left and right wheels.

If the answer of the step 501 is "YES", a step 503 follows to check whether the absolute value of the steered angle $\theta_F$ of the front wheels obtained by the signal from the front wheel steering sensor 16 is smaller than K1 which is a constant prestored in the ROM 17d. No steering of the front wheels is decided when the absolute value of $\theta_F$ is smaller than K1. If so in the step 503, control advances to a step 504 which will be described in detail with reference to FIG. 7 showing the contents of the step 504. In FIG. 7, in a step 601, the difference between the braking pressures $P_{FR}$ and $P_{FL}$ applied to the front wheels is calculated as $|\Delta P| = |P_{FR} - P_{FL}|$, $P_{FR}$ and $P_{FL}$ being sensed by the braking pressure sensors 8a and 8b. The step 601 is followed by a step 602 where the basic rear wheel steering angle $\theta_{RSB}$ is calculated on the basis of $|\Delta P|$, i.e., by using $|\Delta P|$ as a parameter. With reference to FIG. 8A showing the relation between $|\Delta P|$ and $\theta_{RSB}$, the basic rear wheel steering angle $\theta_{RSB}$ is proportionally increased in accordance with increase of the braking pressure difference $|\Delta P|$ until $\theta_{RSB}$ reaches a predetermined value $\theta_{RSB1}$. That is, the maximum value of $\theta_{RSB}$ is limited to $\theta_{RSB1}$. Here, the calculation of $\theta_{RSB}$ is made under the condition that $|\Delta P| = |P_{FR} - P_{FL}|$ is not extremely small, i.e., under the condition that it is over $\Delta P1$. This takes into account noises and so on. The relation shown in FIG. 8 may be stored in the ROM 17d as equations or map.

Figure 8B:
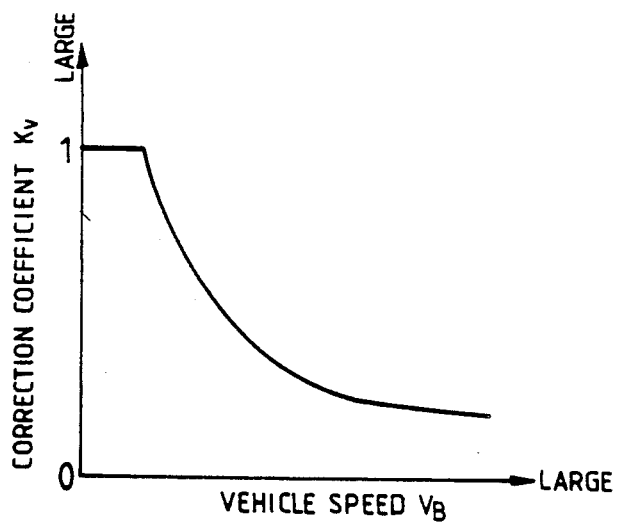
FIG. 8B is a graphic illustration for describing the relation between the correction coefficient of the basic rear wheel steering angle and the vehicle speed.

A step 603 is then executed to calculate a vehicle speed correction coefficient Kv for correcting the basic rear wheel steering angle $\theta_{RSB}$ on the basis of the vehicle speed $V_B$. Here, as shown in FIG. 8B, as the vehicle speed $V_B$ decreases, Kv increases to approach 1. A step 604 follows to calculate the final rear wheel steering angle command value $\theta_{RS}$ as $\theta_{RS} = Kv \cdot \theta_{RSB}$. With the braking control, the braking pressures are controlled independently for the respective wheels and, taking into account the fact that the friction coefficient $\mu$ of the road surface on which the wheel with a lower braking pressure is driven is lower and a yaw moment is generated so that the vehicle tends to be turned to the high $\mu$ road side, the steering control is performed in order to cancel this yaw moment so that the vehicle is directed to the side of the wheel with a lower braking pressure. That is, although in the case of no steering of the rear wheel the advancing direction of the vehicle is compulsorily changed to the high $\mu$ road side, the above-mentioned process causes generation of a yaw moment whereby the vehicle is directed to the low $\mu$ road side, and as a result the yaw moment by which the vehicle is directed to the high $\mu$ road side is cancelled by the yaw moment by which the vehicle is directed to the low $\mu$ road side so that the vehicle can run straight.

On the other hand, if $|\theta_F| \geq K1$ in the step 503, control goes to a step 505 where the rear wheel steering angle as calculated in the step 502 is corrected by taking into account the magnitude and direction of the yaw moment generated due to the difference between the road surface friction coefficients $\mu$ for the left and right wheels. More specifically, in the case that the front wheels are steered to the direction of the yaw moment which is generated due to the braking pressure difference for the left and right wheels and by which the vehicle is directed to the high $\mu$ road side, the rear left and right wheel common steering angle command valve is corrected so that the steering angle of the rear wheel is increased more positively and negatively (that is, in the case of same phase, the absolute value thereof becomes great, and in the case of reverse phase the absolute value thereof becomes small). Whereas, in the case that the front wheels are steered to a direction opposite to the direction of the yaw moment, it is corrected so as to decrease the rear wheel steering angle. That is, since $\theta_{RSN}$ calculated in the step 502 is a value set under the condition that the road surfaces for the left and right wheels are coincident in friction coefficient with each other, as well as the case of steering of the front wheels, the advancing direction of the vehicle is shifted from the normal direction (as shown in FIG. 10, the advancing direction to be taken when the normal steering control is effected with the rear wheel steering angle determined on the basis of the front wheel steering angle and the vehicle speed) because of the yaw moment generated due to the difference between the road surface friction coefficients for the left and right wheels. Therefore, the rear wheel steering angle is corrected so as to cancel the yaw moment generated due to the road surface $\mu$ difference.

Figure 8C:
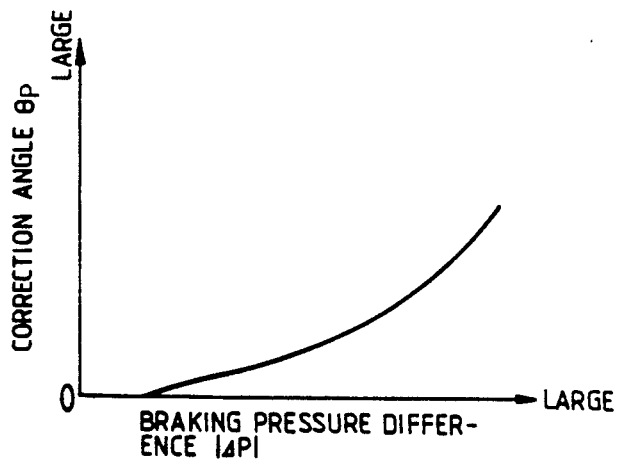
FIG. 8C is a graphic illustration for describing the relation between the correction coefficient of the rear wheel steering angle and the braking pressure difference.

FIG. 9 is a flow chart showing the detail of the process to be executed in the step 505 of FIG. 6. In a step 801, the rear wheel steering angle $\theta_{RSN}$ on non-braking operation is calculated similarly to the step 502 of FIG. 6. After the execution of the step 801, a step 802 is then executed so as to obtain a correction amount $\theta p$ for correcting the rear wheel steering angle $\theta_{RSN}$ on the basis of the difference $|\Delta P|$ between the braking pressures for the front left and right wheels in accordance with the relation as illustrated in FIG. 8C, for example. In the characteristic shown in FIG. 8C, the variation of the rear wheel steering angle $\theta_{RSN}$ corresponding to $|\Delta P|$ is set to be smaller as compared with the case of FIG. 8A. This reason is that, in the case of steering the front wheels, there is the possibility that the accuracy of estimating the left and right road surface friction coefficients $\mu$ on the basis of the braking pressure difference is lowered because of the load movement between the left and right sides of the vehicle and so on.

In a step 803, the direction of the yaw moment to be generated with respect to the vehicle is decided in accordance with the sign of $\Delta P$. That is, when $\Delta P \geq 0$, the decision is "YES", i.e., the yaw moment of the right direction is generated, a step 804 follows to steer the rear wheel by $|\theta p|$ in the left direction to cancel the generated yaw moment. On the other hand, when the decision is "NO" in the step 803, i.e., the yaw moment of the left direction is generated, a step 805 follows to similarly steer the rear wheels by $|\theta p|$ in the right direction therefor.

Returning back to FIG. 6, in a step 506, the actual steering angles of the rear left and right wheels are calculated using the signals from the rear steering angle sensors 15a and 15b. The step 506 is followed by a step 507 in which the rear wheel steering angle command value obtained in the step 505 is compared with the actual steering angles and then followed by a step 508 in which current values to the rear wheel steering control solenoid valves 11a to 11d are calculated so as to reduce the difference therebetween. The calculated current values are supplied to the output circuit 17h in a subsequent step 509.

As described above, by independently positioning the rear wheels in accordance with the difference between the braking pressures of the front left and right wheels, the variation of the operating characteristic of the vehicle due to the road surface $\mu$ difference is limited to the minimum whereby the vehicle can be controlled stably.

Although in the above description the steering angles of the rear wheels are calculated on the basis of the braking pressure difference of the front left and right wheels, it is also appropriate to determine it by further taking into account the braking pressures for the rear left and right wheels. For example, the rear wheel steering angles may be calculated as a function of the average value of the front left and right braking pressure difference $|\Delta P_F|$ and the rear left and right braking pressure difference $|\Delta P_R|$. At this time, in the case that the $\Delta P_F$ and $\Delta P_R$ are different in sign with each other, the rear wheel steering control is not performed and the rear wheels may be returned to the neutral positions.

A description will be made hereinbelow in terms of another embodiment of this invention in which the braking control is effected without using the braking pressure sensors (8a to 8d in FIG. 1).

Figure 11:
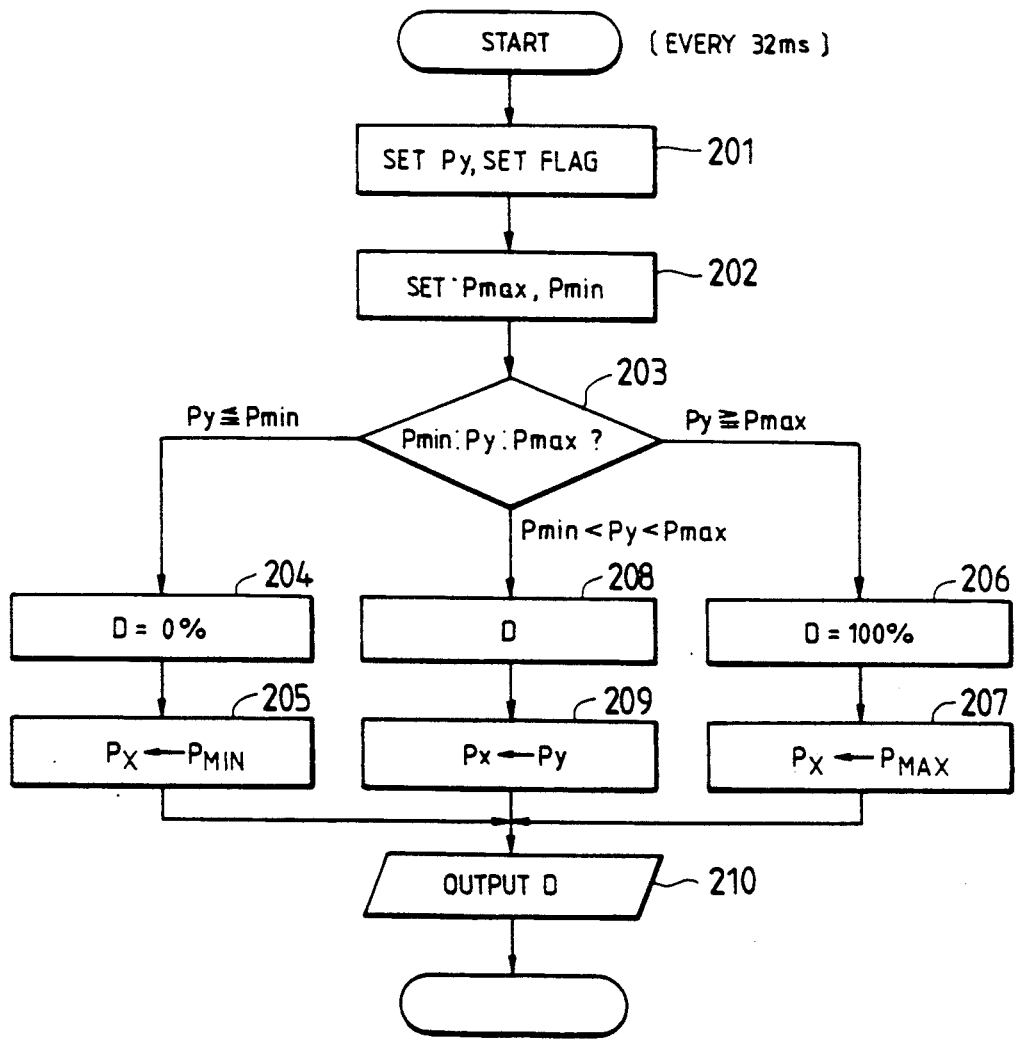
FIG. 11 is a flow chart showing braking control.

In FIG. 11 being a flow chart showing an operation of the electronic control unit (ECU) 17 executed at a predetermined interval (for example, 32 ms), the ECU first executes a step 201 in which a target value Py of the braking hydraulic pressure is set for each of the wheels and a flag is set to indicate that the vehicle is on the braking control. As well as the case of FIG. 3, the target hydraulic pressure values Py for the wheels are determined as follows on the basis of the voltage signals from the wheel speed sensors 10a to 10d and reference values prestored in the ROM 17d.

$$Wp = K1 \cdot (Vw - V_B + K2) + K3 \cdot (\dot{V}w - \dot{V}_B)$$

$$P_{MED(n)} = P_{MED(n-1)} + K4 \cdot Wp$$

$$Py = P_{MED(n)} + K5 \cdot Wp$$

where $V_B$ represents a vehicle speed, Vw designates a wheel speed and K1, K2, K3, K4, K5 are constants, and Wp and $P_{MED}$ are parameters for determining Py.

The vehicle speed $V_B$ may be estimated from the wheel speeds Vw or obtained directly using a vehicle speed sensor. Of Py thus obtained, the target hydraulic pressures for the front left and right wheels will be referred hereinafter to as $Py_{FL}$ and $Py_{FR}$, respectively.

A subsequent step 202 is executed to set estimated hydraulic pressures Px in steps 205, 207, 209 and obtain Pmax, Pmin on the basis of each the present estimated hydraulic pressure Px using the map of FIG. 4 or the above-mentioned equation $Py=(Px+0.344d) \cdot 0.5e^{0.0217d}$. The initial value of the estimated hydraulic pressure Px is set appropriately. When the actual braking pressure at the time of starting of the control is Pxo' and when the estimated hydraulic pressure at the time of the control starting, i.e., the initial value of Px, is Pxo, Pxo may be set to an appropriate value, for example, a value slightly greater than the maximum braking pressure normally considered. Here, Pmax is an estimated hydraulic pressure value to be obtained at the end of period in the case of duty ratio of 100%, i.e., in the case that a command signal indicative of only pressure-increasing is outputted to the two-position solenoid valve 7a, 7b, 7c or 7d. Pmin is an estimated hydraulic pressure value to be obtained at the end of period in the case of duty ratio of 0%, i.e., in the case that a command signal indicative of only pressure-decreasing is outputted thereto.

In a step 203, the target hydraulic pressure Py is compared in magnitude with Pmax and Pmin. If Py≦Pmin, in a step 204, the duty ratio D is set to 0% indicating only pressure-decreasing, and in a step 205 Pmin is set as the estimated hydraulic pressure Px. If Py≧Pmax, in a step 206, the duty ratio D is set to 100% indicating only pressure-increasing, and in a step 207 Pmax is set as the estimated hydraulic pressure Px. Furthermore, if Pmin<Py <Pmax, in a step 208, the duty ratio D is determined in accordance with a map as shown in FIG. 4 (if required, an interpolation calculation is added), and in a step 209 Py is set as Px. Similarly, the duty ratio D is determined as D = 100·d/32 and the equation corresponding to the FIG. 4 map can be expressed as follows:

$$Py = (Px + 0.344d) \cdot 0.5e^{0.0217d}$$

Finally, in a step 210, an exciting current pulse corresponding to the duty ratio D determined in the step 204, 206 or 208 is supplied to the two-position solenoid valve 7a, 7b, 7c or 7d.

Figure 12:
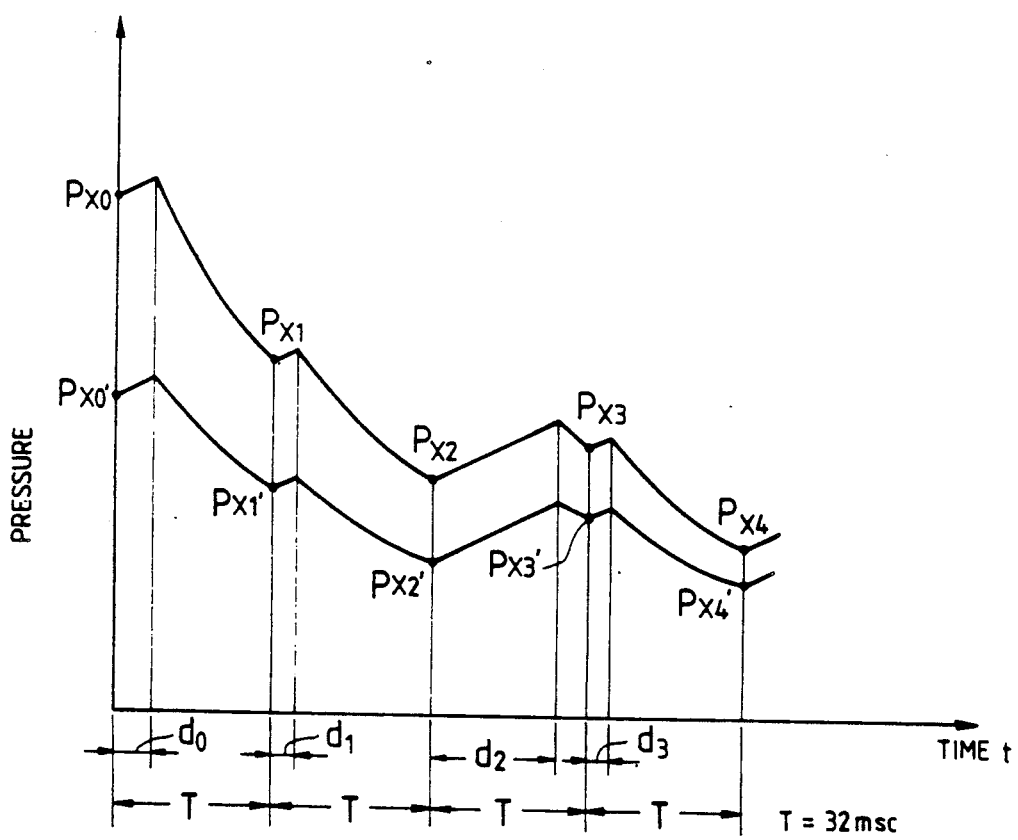
FIG. 12 is a graphic illustration for describing the hydraulic pressure in connection with the duty ratio for the braking pressure control solenoid valve.

With above-mentioned processes, as shown in FIG. 12, even if the hydraulic pressure in the wheel cylinder 9 is Pxo' at the time of the control and the initial value on the control is Pxo, the duty ratio D is successively determined as D = 100·di/T (where i=0, 1, 2, ... and T is the processing period of the braking control by the electronic control unit 17 and in this case T=32 ms). An exciting current pulse is outputted in correspondence with the determined duty ratio D and as a result the hydraulic pressure on the control approaches the actual hydraulic pressure with time passage.

Figure 13:
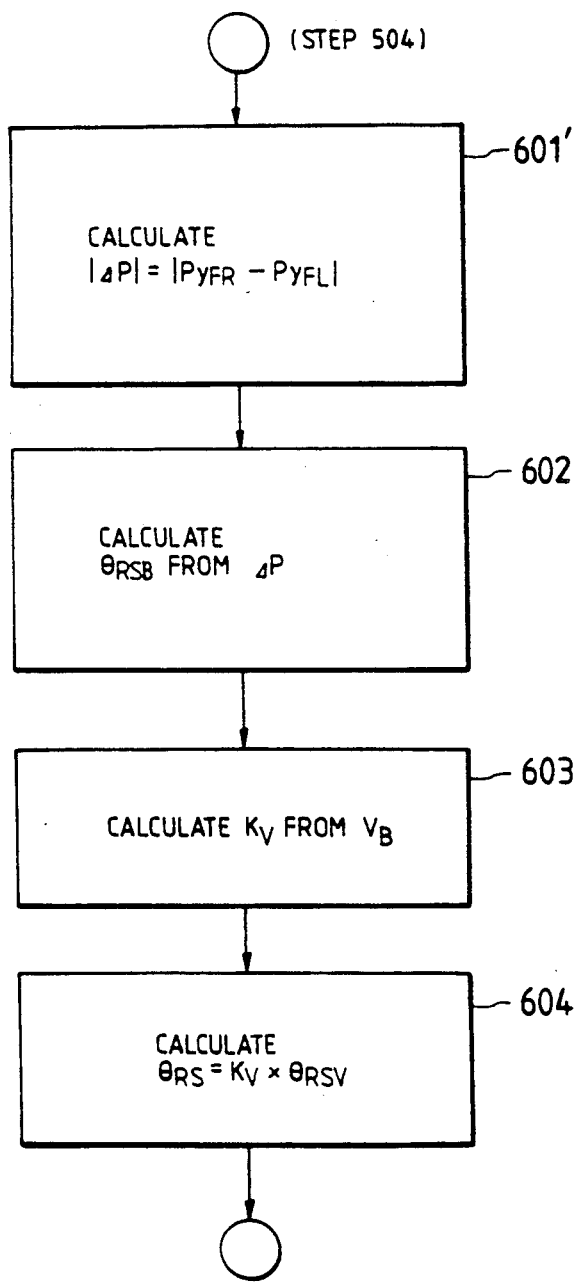
FIG. 13 is a flow chart showing the detail of the step of the FIG. 6 flow chart.

Thus, the braking pressure is controlled so that each of the wheels assumes the optimal slip ratio to independently perform the anti-skid control for the respective wheels. Here, in the rear wheel steering control of the second-mentioned embodiment, instead of obtaining the braking pressure information ($P_{FR}$, $P_{FL}$ in the step 601 of FIG. 7) from the braking pressure sensors, as shown in FIG. 13, the front wheel target hydraulic pressure value $Py_{FR}$ and $Py_{FL}$ are used. In the flow chart of FIG. 13, the other steps 602 to 604 correspond to those of FIG. 7. In this case, because of no provision of the braking pressure sensors, the structure become simple as compared with the first-mentioned embodiment. It is also appropriate that the present estimated hydraulic pressure value Px is used as the braking pressure in place of the target hydraulic pressure Py.

Although in the above-described embodiments the braking control and the steering control are effected by using only one CPU, it is also appropriate to independently perform both the control using two CPUs. Furthermore, in a front-wheel steering and rear-wheel driving type vehicle, in the case that the front two wheels are independently brake-controlled and the rear two wheels are controlled with the same braking pressure, it is appropriate that the front wheels are steered for the road surface μ correction.

Figure 14:
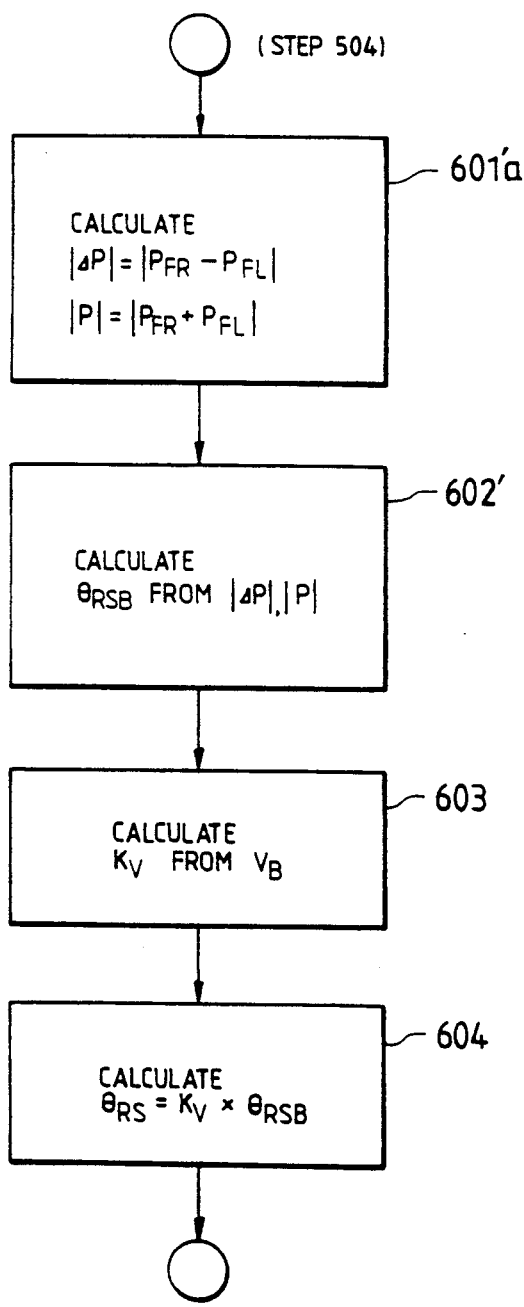
FIG. 14 is a flow chart showing a further modification of the step of FIG. 6 flow chart.

A third embodiment of the present invention will be described hereinbelow with reference to FIG. 14 which shows a modification of the rear wheel steering control of FIG. 6, i.e., the process of the step 504 shown in FIG. 7. One difference of the process of FIG. 7 with respect to the process of FIG. 14 is that the basic rear wheel steering angle $\theta_{RSB}$ is obtained on the basis of the absolute value $|\Delta P|(=|P_{FR}-P_{FL}|)$ of the difference in braking pressure between the front left and right wheels and further the absolute value $|P|(=|P_{FR}+P_{FL}|)$ of the sum of the braking pressures for the front left and right wheels. More specifically, in FIG. 14, a step 601'a is first executed in order to calculate, on the basis of the braking pressures values $P_{FR}$, $P_{FL}$ from the front wheel braking pressure sensors, the absolute value $|\Delta P|(=|P_{FR}-P_{FL}|)$ of the braking pressure difference between the front left and right wheels and the absolute value $|P|(=|P_{FR}+P_{FL}|)$ of the sum of the braking pressures for the front left and right wheels. A step 602' follows to calculate the basic rear wheel steering angle $\theta_{RSB}$ on the basis of the calculated $|\Delta P|$ and $|P|$ (parameters) in accordance with the following equation (4).

$$\theta_{RSB} = C6|\Delta P|/|P| \tag{4}$$

where C6 is a constant.

Figure 15A:
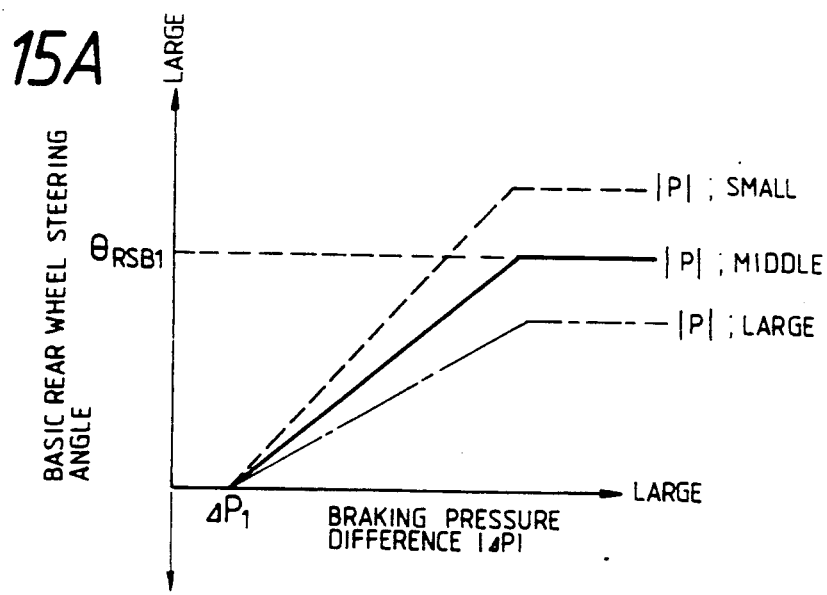
FIG. 15A is a graphic illustration for describing the relation between the basic rear wheel steering angle and the braking pressure difference between a pair of left and right wheels in accordance with the sum of the braking pressures therefor.
Figure 15B:
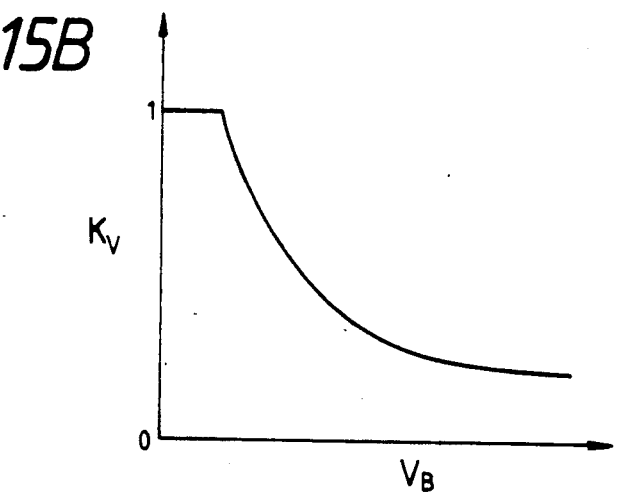
FIG. 15B is a graphic illustration for describing the relation between the correction coefficient of the basic rear wheel steering angle and the vehicle speed.

FIG. 15a shows one example of the relation between $\theta_{RSB}$ and $|\Delta P|$ in accordance with the magnitudes (large, middle and small) of $|P|$. Here, $\theta_{RSB}$ proportionally increases as $|\Delta P|$ increases and, on the other hand, $\theta_{RSB}$ increases as $|P|$ decreases. However, $\theta_{RSB}$ is similarly limited to predetermined values. In addition, the lower limit ($\Delta P1$) is determined with respect to $|\Delta P|$. Subsequently, a step 603 is executed in order to obtain correction coefficient Kv for correcting $\theta_{RSB}$ on the basis of the vehicle speed $V_B$. The correction coefficient Kv is determined in accordance with showing the relation between $V_B$ and KV as shown in FIG. 15B. The step 603 is followed by a step 604 in which the final (corrected) rear wheel steering angle command value $\theta_{RS}$ is calculated as $\theta_{RS} = Kv \cdot \theta_{RSB}$.

Figure 15C:
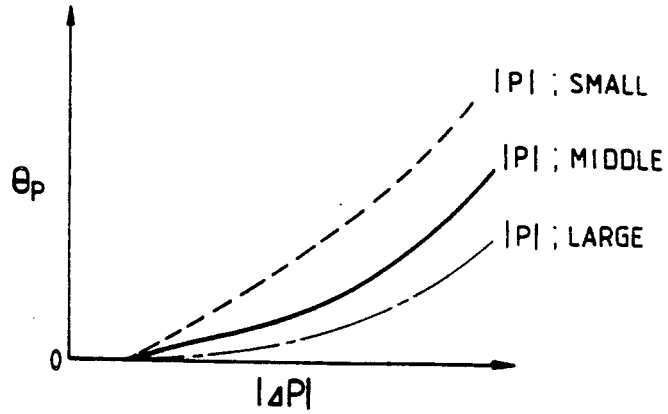
FIG. 15C is a graphic illustration for describing the relation between the correction coefficient of the rear wheel steering angle and the braking pressure difference in accordance with the sum of the braking pressures therefor.

Furthermore, in the third embodiment, when $|\theta_F| \geq K1$ in the step 503 of FIG. 6, the step 505 is executed as shown in FIG. 16 which shows a modification of the process of FIG. 9. That is, in a step 801, the rear wheel steering angle $\theta_{RSN}$ on no braking control is similarly calculated, and in a step 802' a correction term $\theta p$ is calculated on the basis of $|\Delta P|$ and $|P|$. FIG. 15C shows the relation between $\theta p$ and $|\Delta P|$ in accordance with the magnitudes (large, middle and small) of $|P|$. That is, when $|P|$ is large, $\theta p$ becomes relatively small as indicated by a chain line, and when $|P|$ is small, $\theta p$ becomes relatively large as indicated by a dotted line. Here, although $\theta p$ is used for the correction, it is also appropriate to use $\theta_{RSB}$ in the step 602' of FIG. 14 instead of $\theta p$. The other steps of FIG. 16 correspond to those in FIG. 9.

A description will h=made hereinbelow in terms of a determining method of the basic rear wheel steering angle $\theta RSB$ necessary for braking the motor vehicle with the variation of the advancing direction of the vehicle being restrained to the minimum by slight steering.

When taking into account the braking force and side force applied to the wheel, as shown in FIG. 17A, the braking force B results in little variation when the steering angle $\theta$ is below 5 degrees and can be expressed in accordance with the following equation (5).

$$Bi = \mu i W i \tag{5}$$

where $\mu$ represents the friction coefficient between the road surface and the wheel, W designates the load applied to the wheel, and i represents one of FL wheel, FR wheel, RL wheel and RR wheel.

Figure 17B:
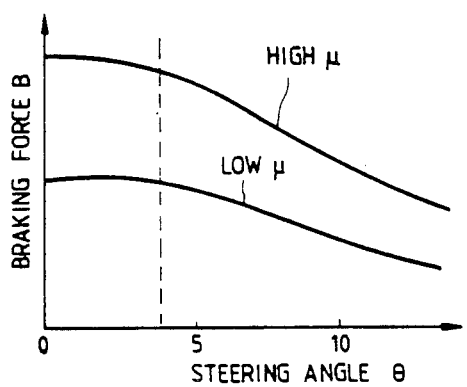
FIG. 17B illustrates the relation between the steering angle and the side force.
Figure 17B:
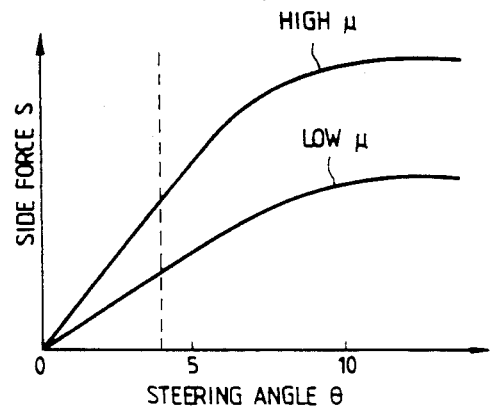

On the other hand, as shown in FIG. 17B, when the steering angle $\theta$ is relatively small, the side force S is substantially proportional to the steering angle $\theta$ and the side force S can be expressed as follows under the condition of the basic rear wheel steering angle $\theta_{RSB}$.

$$Si = C1 \mu W \theta_{RSB} \tag{6}$$

where C1 is a constant.

Figure 18:
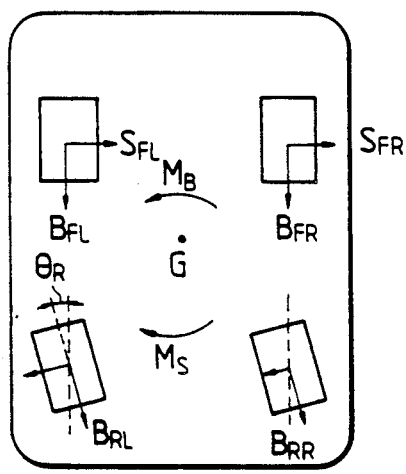
FIG. 18 is an illustration of moments generated about the center of gravity of the motor vehicle.

Here, as shown in FIG. 18, when the braking rotational moment generated about the center of gravity G of the vehicle due to the braking difference between the left and right wheels is $M_B$ and the side force rotational moment generated about the center of gravity G due to the side force of the wheels is $M_S$, stable braking can be effected without variation of the vehicle advancing direction under the condition of $M_B = M_S$. Here, if expressing the braking force and side force of the left side wheel as $B_L$ and $S_L$ and further expressing the braking force and side force of the right side wheel as $B_R$ and $S_R$, the following equation (7) is satisfied:

$$C2 \cdot |B_L - B_R| = C3 (S_L + S_R) \tag{7}$$

where C2 and C2 are constants.

In accordance with the substitution of the above-mentioned equations (5) and (6) into the equation (7), the following equation (8) can be obtained:

$$\theta_{RSB} = C4 \cdot |\mu_L - \mu_R| / (\mu_L + \mu_R) \tag{8}$$

where C4 is a constant.

On the other hand, when taking into account the equilibrium of the moments applied to one wheel, it can be expressed as follows:

$$(I/R) \cdot \dot{V}w = \mu \cdot W \cdot R - C5 \cdot r \cdot p \tag{9}$$

where I represents the moment of inertia of the wheel, R designates the radius of the wheel, Vw is the acceleration of the wheel, r represents the distance between the braking pad and the rotational center of the wheel. P designates the braking pressure and C5 is a constant.

$|\mu_L - \mu_R|$ and $\mu_L + \mu_R$ are obtained as follows from the equation (9).

$$|\mu_L - \mu_R| = A|P_L - P_R| + B |\dot{V}w_L + \dot{V}w_R| \tag{10}$$

$$\mu_L + \mu_R = A (P_L + P_R) + B |\dot{V}w_L + \dot{V}w_R| \tag{11}$$

Here, the wheel acceleration $\dot{V}w$ and the vehicle speed $V_B$ be expressed as follows:

$$\dot{V}w = (1-S) \dot{V}_B \tag{12}$$

$$m\dot{V}_B = W_B(\mu_L + \mu_R)/2 \tag{13}$$

where S represents the slip ratio and $W_B$ designates the load of the entire vehicle.

Thus, the equations (10) and (11) are rewritten as follows:

$$|\mu_L - \mu_R| = A |P_L - P_R| \tag{14}$$

$$(\mu_L + \mu_R) = A'(P_L + P_R) \tag{15}$$

Therefore, by the substitution of the equations (14) and (15) into the equation (8), the basic rear wheel steering angle $\theta_{RSB}$ can be obtained as follows.

$$\theta_{RSB} = C6 \cdot |P_L - P_R| / (P_L + P_R) \tag{16}$$

From the above description, it will be understood that the rear wheel steering angle $\theta_{RSB}$ necessary for restraining the variation of the vehicle advancing direction on the braking operation to the minimum by slight rear wheel steering can be calculated on the basis of the difference $|\Delta P|(=|P_L - P_R|)$ in braking pressure between the right and left wheels and the sum $|P|$ of the braking pressures for the right and left wheels in accordance with the above-mentioned equation (4).

Although in the above description the rear wheel steering angle is obtained on the basis of the absolute values of the braking pressure difference between the front left and right wheels and the sum of the braking pressures for the front left and right wheels, it is also appropriate to further take into account the braking pressures for the rear left and right wheels. For example, the rear wheel steering angle can be calculated on the basis of the average value of the front left and right wheel braking pressure difference $|\Delta P_F| \cdot WF$ and the rear left and right wheel braking pressure difference $|\Delta P_R| \cdot WP$ or the average value of the front left and right wheel braking pressure absolute value $|P_F| \cdot WF$ and the rear left and right wheel braking pressure absolute value $|P_F| \cdot WR$, where WF is the load applied to the front wheel shaft and WR is the load applied to the rear wheel shaft. In this case, when the signs of $\Delta P_F$ and $\Delta P_R$ are different with each other, the rear wheel steering is not performed and the rear wheel may be restored to the neutral position.

Figure 19:
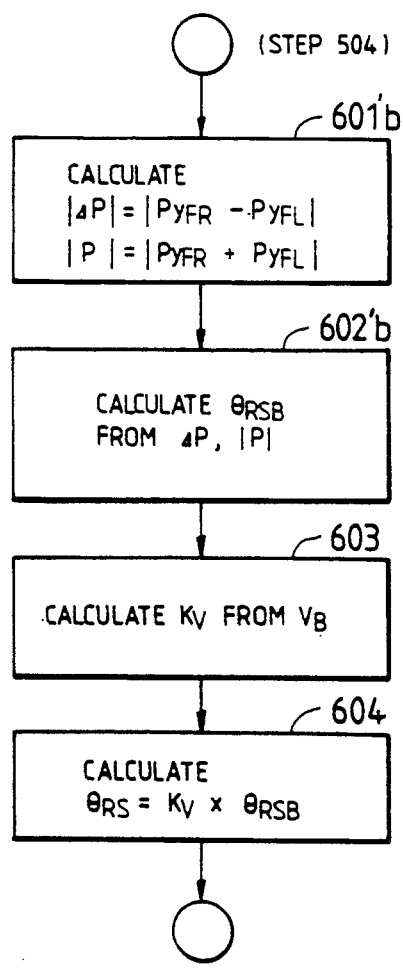
FIG. 19 is a flow chart showing a further modification of the step of the FIG. 6 flow chart.

Similarly, as well as the case of the above-mentioned second embodiment, it is possible to perform the control without using the braking pressure sensors. In this case, the process of the step 504 of FIG. 6 is performed as shown in FIG. 19, that is, the basic rear wheel steering angle is calculated on the basis of the absolute values $|\Delta P|$ and $|P|$ of the difference between the target hydraulic pressures $Py_{FR}$ and $Py_{FL}$ and the sum thereof in steps 601'b and 602'b.

Although in the third embodiment the steering angles for the rear left and right wheels are equal to each other, it is also possible to independently determine the steering angles therefor. That is, it is appropriate that for obtaining the side force for correcting the vehicle advancing direction, the steering angle is set to be larger with respect to the high $\mu$ road side at which the side force is large and the steering angle is set to be smaller with respect to the low $\mu$ road side. Furthermore, it is also appropriate to use only one steering actuator for the rear left and right wheels and use only one solenoid valve instead of using the two solenoid valves 11a and 11d. In addition, it is possible to use other drive devices such as electric motor instead of the rear wheel steering hydraulic pressure actuator.

Although in the above description of the third embodiment the basis rear wheel steering angle $\theta_{RSB}$ is calculated on the basis of $|\Delta P|$ and $|P|$, it is also possible to use, in place of $|P|$, the side force or wheel torque (moment about the wheel shaft) which is measured directly by means of an appropriate device such as strain gage for detecting the distortion of the suspension arm and load sensor for directly meansing the load applied to the arm.

Figure 20:
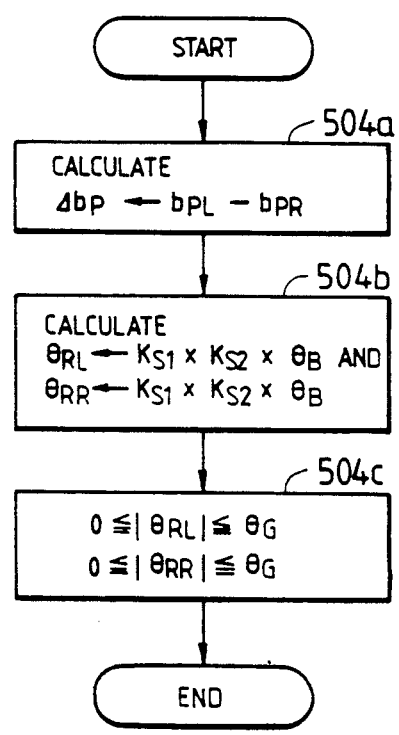
FIG. 20 is a flow chart showing a further modification of the step of the FIG. 6 flow chart.
Figure 21A:
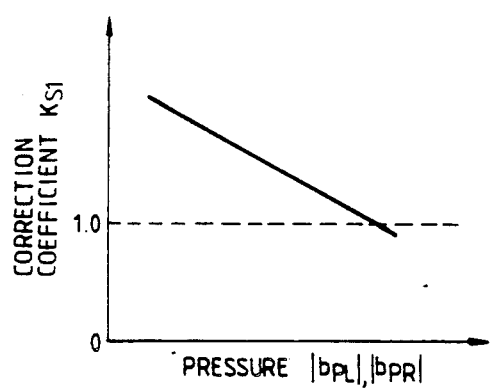
FIG. 21A is a graphic illustration for describing the relation between the braking pressure and a correction coefficient.
Figure 21C:
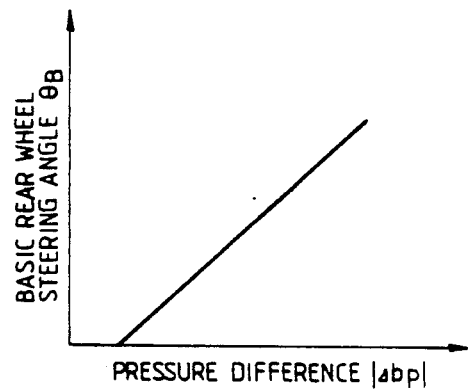
FIG. 21C is a graphic illustration for describing the relation between the vehicle speed and another correction coefficient.
Figure 21B:
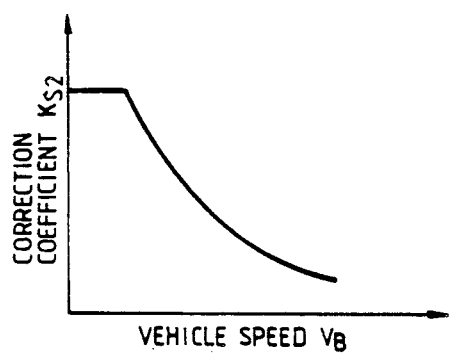
FIG. 21B is a graphic illustration for describing the relation between the braking pressure difference and the basic rear wheel steering angle.

A further description will be made hereinbelow in terms of a fourth embodiment of this invention. One difference of the fourth embodiment with respect to the first or third embodiment relates to the process (the step 504 in FIG. 6) performed when the front wheels are in the non-steered state, that is, when the absolute value $|\theta P|$ of the steering angle of the front wheels is smaller than the constant K1. FIG. 20 is a flow chart showing the process executed in the step 504 when $|\theta P| < K1$. In FIG. 20, control starts with a step 504a to calculate the difference $\Delta bp$ between braking pressures $b_{PR}$ and $b_{PL}$ applied to the rear left and right wheels and sensed by means of the braking pressure sensors 8c and 8d as $\Delta bp = b_{PL} - b_{PR}$. A step 504b is then executed in order to respectively calculate steering angle command values $\theta_{RL}$ and $\theta_{RR}$ on the basis of the calculated rear wheel braking pressure difference $\Delta bp$, the obtained vehicle speed $V_B$, and rear wheel braking pressures $b_{PL}$ and $b_{PR}$ in accordance with the following equations (17) and (18).

$$\theta_{RL} = Ks1 \cdot Ks2 \cdot \theta_B \quad (17)$$

$$\theta_{RR} = Ks1 \cdot Ks2 \cdot \theta_B \quad (18)$$

where Ks1 represents a braking absolute pressure correction coefficient which can be obtained on the basis of $|b_{PL}|$ or $|b_{PR}|$ in accordance with the relation as shown in FIG. 21A, $|b_{PL}|$ being used for the calculation of $\theta_{RL}$ and $|b_{PR}|$ being used for the calculation of $\theta_{RR}$, Ks2 designates a vehicle speed correction coefficient which is obtained in accordance with the relation as shown in FIG. 21B, and $\theta_B$ is a basic rear wheel steering angle command value which is obtained on the basis of the absolute value $|\Delta bp|$ in accordance with the relation as shown in FIG. 21C. The coefficient Ks1 is independently determined for the rear left and right wheels because of being respectively calculated on the basis of the absolute values $|b_{PL}|$ and $|b_{PR}|$ of the braking pressures for the rear left and right wheels.

Figure 21D:
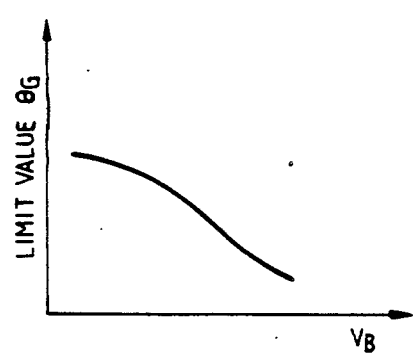
FIG. 21D is a graphic illustration for describing the relation between the vehicle speed and the limit value of the rear wheel steering angle.

The step 504b is followed by a step 504c to provide limitation for the rear wheel steering angle command values $\theta_{RL}$ and $\theta_{RR}$. That is, $\theta_{RL}$ and $\theta_{RR}$ are respectively limited to values between $-\theta_G$ and $+\theta_G$ which are determined on the basis of the vehicle speed $V_B$ in accordance with the relation as shown in FIG. 21D.

Figure 22:
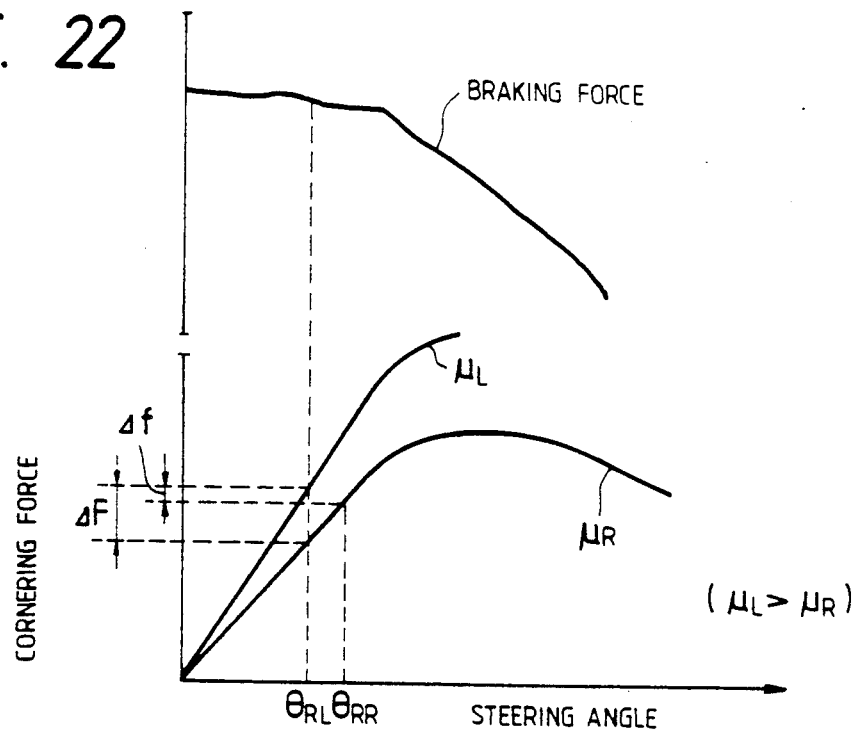
FIG. 22 is a graphic diagram showing the relation between the cornering force and the steering angle.

With the above-described processes, the steering angle is varied in accordance with the frinction coefficient between the wheel and the road surface, that is, the calculated steering angle command value becomes larger with respect to the wheel with lower braking pressure. This is for removing the problem that the cornering forces of the left and right wheels are different from each other in accordance with the difference between the friction coefficients for the left and right wheels as shown in FIG. 22 where $\mu L$ represents the friction coefficient for the left wheel, $\mu R$ designates the friction coefficient for the right wheel, $\Delta F$ is the difference in cornering forces between the left and right wheels which is produced when the steering angle command values for the left and right wheels are equal to each other, and $\Delta f$ is the cornering force difference which occurs when the fourth embodiment is performed, $\Delta f$ being close to zero and becoming considerably small as compared with $\Delta F$.

Figure 23:
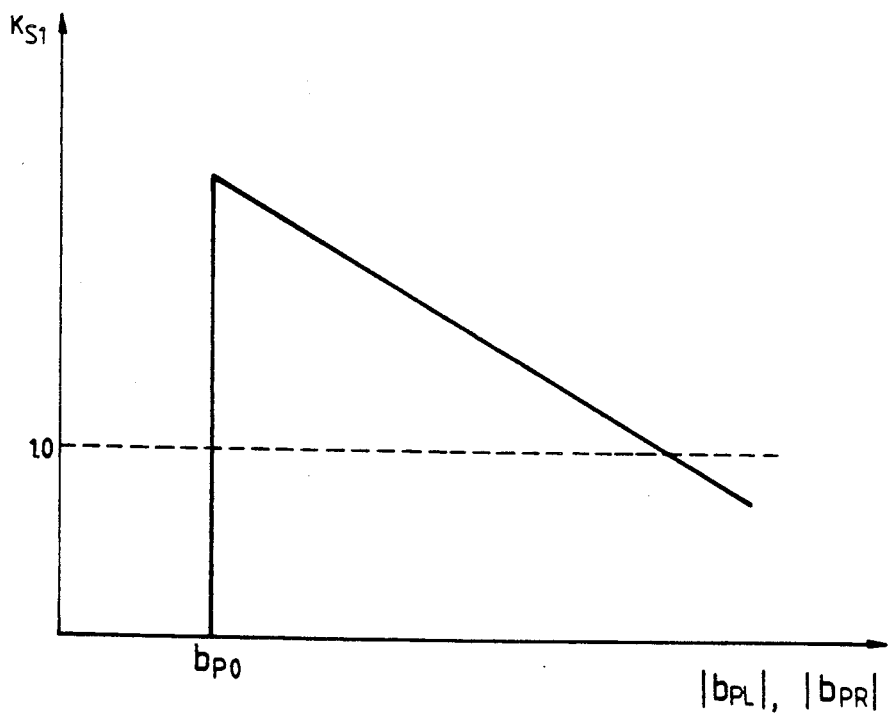
FIG. 23 is a graphic diagram showing another relation between the braking pressure and the correction coefficient.

Here, although in the above description Ks1 is determined in accordance with the relation shown in FIG. 21A, it is also appropriate to determine Ks1 in accordance with the relation as shown in FIG. 23. That is, when $|b_{PL}|$ or $|b_{PR}|$ is below a predetermined value bpo, the corresponding Ks1 is set to be zero. This is for avoiding unnecessary wheel steering.

Figure 24:
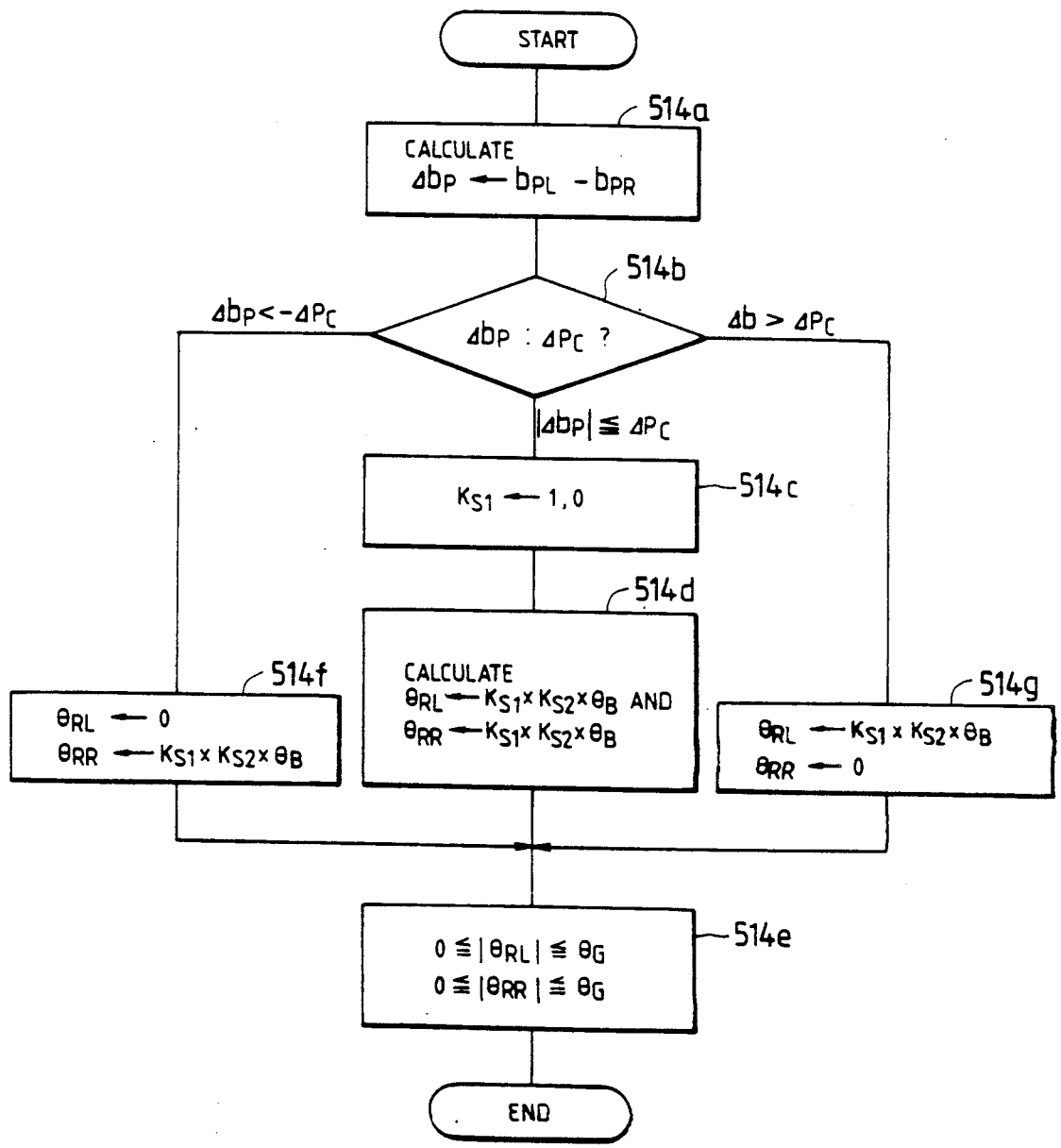
FIG. 24 is a flow chart for describing further steering control.

FIG. 24 is a flow chart showing a further modification of the process of the step 504 of FIG. 6. In FIG. 6, a step 514a is first executed to similarly calculate the difference $\Delta bp$ between the braking pressures $b_{PL}$ and $b_{PR}$, followed by a step 514b in which $\Delta bp$ is compared with a predetermined value $\Delta Pc$. If the absolute value

|Δbp| thereof is smaller than ΔPc, a step 514c follows to set the braking absolute pressure correction coefficient Ks1 to 1.0, thereby calculating the rear wheel steering angle command values $\theta_{RL}$ and $\theta_{RR}$ in a step 514d. In this case, $\theta_{RL}$ and $\theta_{RR}$ become equal to each other. This is allowed because of no difference in cornering force between the left and right wheels. A step 514e is then executed to provide limitation for $\theta_{RL}$ and $\theta_{RR}$ as well as the process of the step 504c of FIG. 20.

On the other hand, if Δbp < −ΔPc in the step 514b, a step 514f is executed so that the steering angle command value $\theta_{RL}$ is set to be zero and the steering angle command value $\theta_{RR}$ is calculated in accordance with the above-mentioned equation (18). Furthermore, If Δbp > ΔPc therein, $\theta_{RR}$ is set to be zero and $\theta_{RL}$ is calculated in accordance with the equation (17).

The operation of FIG. 23 causes prevention of lowering of the braking force of the vehicle in the case that the cornering force of one wheel is insufficient because the friction coefficient is low.

Figure 25:
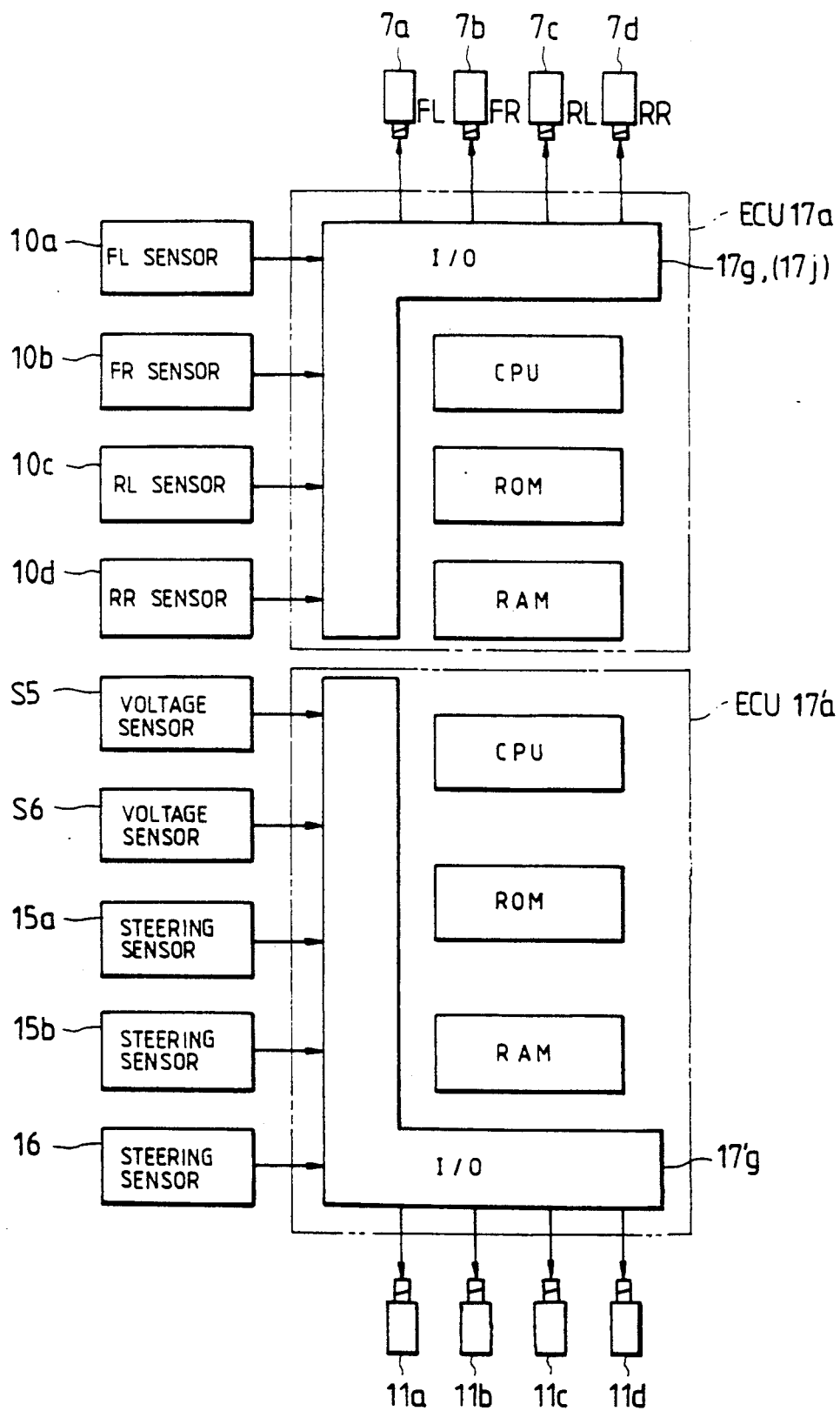
FIG. 25 is a block diagram showing another entire arrangement of the electronic control unit used in the steering control apparatus according to this invention.

A still further embodiment of this invention will be described hereinbelow with reference to FIGS. 25 to 28. FIG. 25 is a schematic illustration of the entire arrangement of this embodiment in which parts corresponding to those in the above-described embodiments are marked with the same numerals and the description will be omitted for brevity. In the illustration of FIG. 25, a further electronic control unit 17a' is included which is coupled through an output/input port 17g' to voltage sensors S5 and S6 which are adapted to measure driving voltages (or driving currents) of braking pressure control solenoid valves 7a and 7b for the front wheels so as to detect the drive states thereof.

Figure 26:
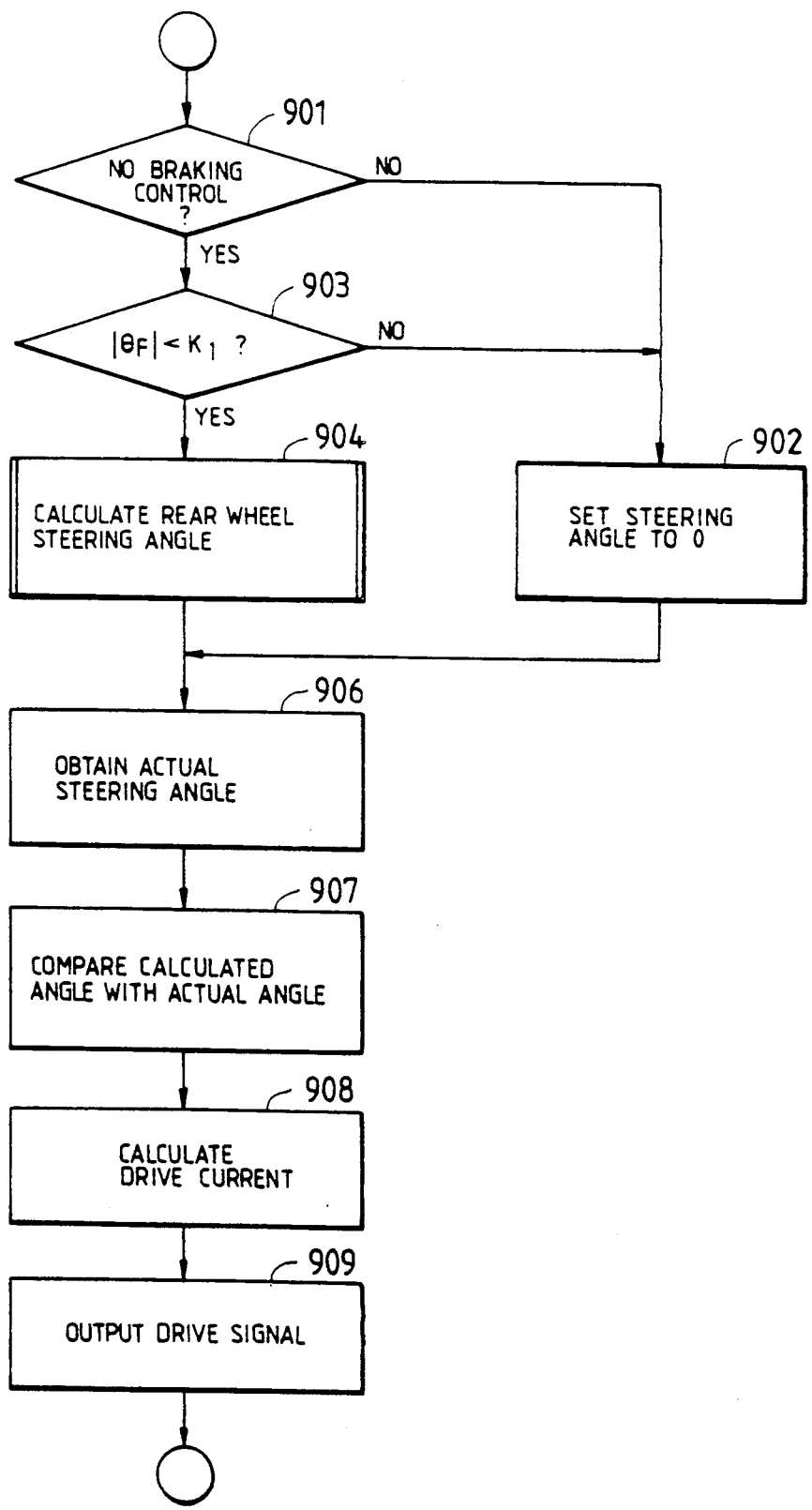
FIG. 26 is a flow chart showing the processes of the steering control performed in the FIG. 25 arrangement.
Figure 27:
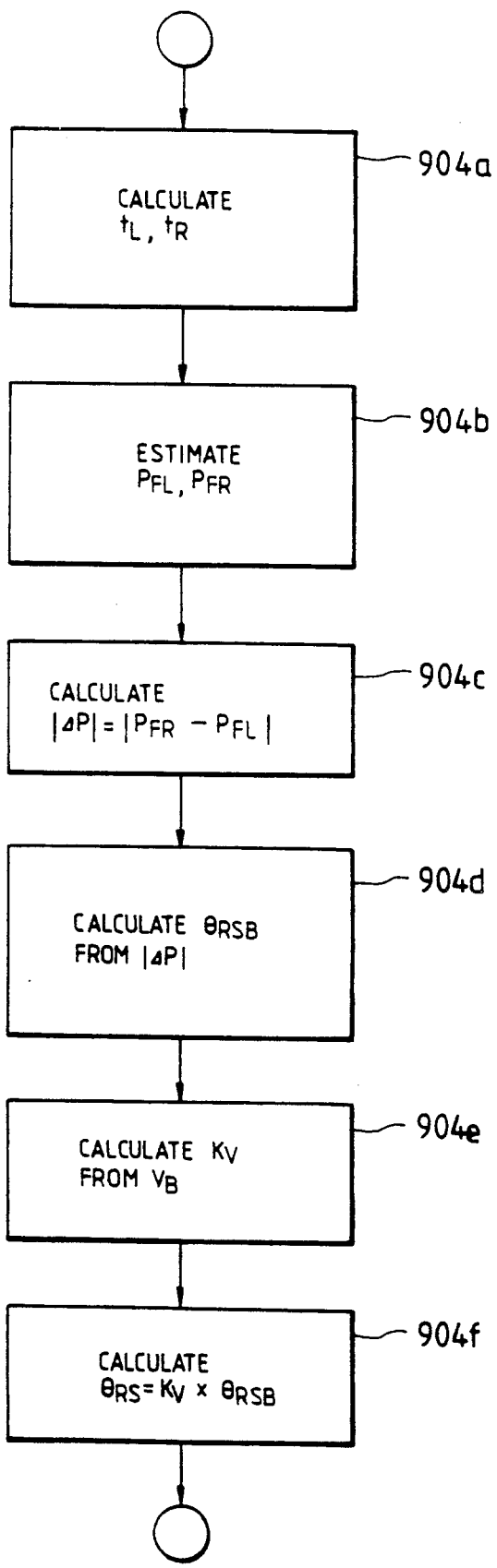
FIG. 27 is an illustration of the detail of the step of the FIG. 26 flow chart.

FIG. 26 is a flow chart showing the rear wheel steering control according to this embodiment, the operation being executed at a predetermined interval, for example, 8 ms. In FIG. 26, this operation starts with a step 901 to check, on the basis of the signals from the voltage sensors S5, S6, whether the vehicle is on the braking control. If not, a step 902 follows to set the rear wheel steering angle command value to zero. If the decision of the step 901 is "YES", control goes to a step 903 (corresponding to the step 503 in FIG. 6) in which it is checked whether the absolute value of the steering (operation) angle $\theta_F$ of the front wheel is smaller than a predetermined value K1. If $|\theta_F| \geq k1$, the operational flow goes to the step 902. On the other hand, if $|\theta_F| > k1$, that is, when the front wheels is in the no steering states, the operational flow goes to a step 904 to calculate the rear wheel steering angle command value which step will be in turn described in detail with reference to FIG. 27. In FIG. 27, in a step 904a, the opening and closing states of the braking pressure control solenoid valves 7a, and 7b for the front wheels are checked on the basis of the signals from the voltage sensors S5 and S6 so as to obtain the opening times $t_L$ and $t_R$ of the solenoid valves 7a and 7b. A step 904b follows to obtain estimated values $P_{FL}$ and $P_{FR}$ of braking pressures for the front wheels. This estimation is based upon the fact that the braking two-position solenoid valve is controlled so that the present hydraulic pressure becomes equal to the calculated target hydraulic pressure as described in the European Patent Provisional Publication No. 231113. That is, the increasing and decreasing characteristics of the braking hydraulic pressure can be expressed as follows:

$$P\ (increasing) = Po + a \cdot t \qquad (19)$$

$$P\ (decreasing) = Po\ e^{-b \cdot t} \qquad (20)$$

where a and b are respectively constants and t is time.

Figure 28:
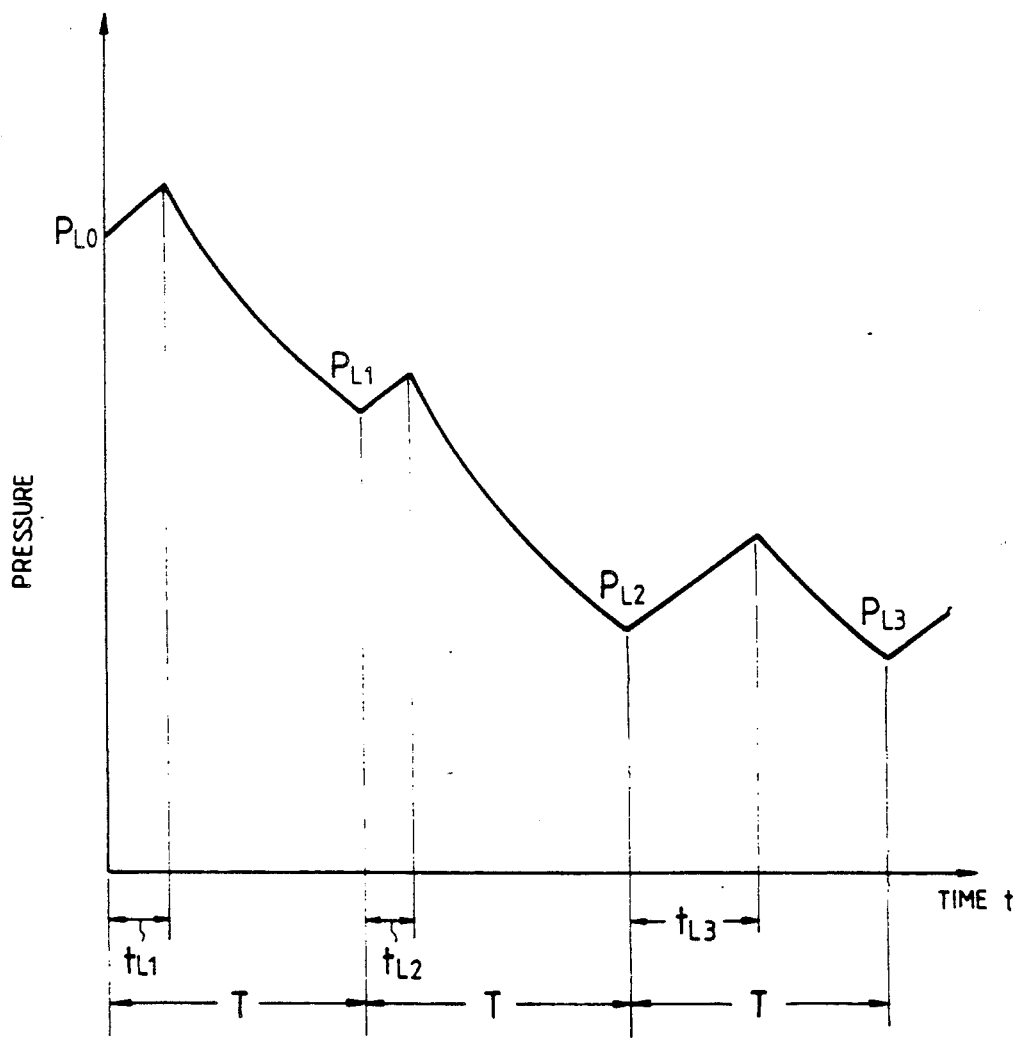
FIG. 28 is a graphic illustration for describing the variation of the braking hydraulic pressure in accordance with the opening time of the braking control solenoid valve.

Thus, with reference to FIG. 28, when one period of the increasing and decreasing of the hydraulic pressure is T, the hydraulic pressure PL1 at the time of the end of one period after the initial value PLo can be obtained in accordance with the following equation (21).

$$PL1 = (PLo + a \cdot t_L) \cdot e^{-b(T - t_L)} \qquad (21)$$

Accordingly, if the opening time ($t_L1$, $t_L2$, $t_L3$) of the solenoid valve is obtained at every one period, the braking pressure estimated value $P_L$ at a given time, i.e., value estimated to be obtained at a given time from the time of the initial value PLo after the calculation of the target hydraulic pressure, can be obtained in accordance with the above-mentioned equation (21).

In a step 904c, the absolute value of the braking pressure difference is calculated on the basis of the front left and right wheel estimated braking hydraulic pressures $P_{FL}$ and $P_{FR}$ as $|\Delta P| = |P_{FL} - P_{FR}|$, followed by a step 904d to calculate the basic rear wheel steering angle $\theta_{RSB}$ using $|\Delta P|$ as a parameter in accordance with the relation as shown in FIG. 8A. Subsequently, a step 904e is executed in order to obtain the correction coefficient Kv for correction of $\theta_{RSB}$ on the basis of the vehicle speed $V_B$ in accordance with the reaction as shown in FIG. 8B, and a step 904f is executed to calculate the final rear wheel steering angle command value $\theta_{RS}$ as $\theta_{RS} = Kv \cdot \theta_{RSB}$.

Thereafter, returning back to the processes of FIG. 26, steps 906 to 909 are executed as well as the steps 506 to 509 of FIG. 6.

The difference between the second-mentioned embodiment and the final-mentioned embodiment is as follows. That is, although both are common in terms of no provision of the braking pressure sensors, in the second-mentioned embodiment, the initial Py is obtained on the basis of Pxo and $P_{MEDo}$ at the time of the control which are predetermined and then Px is successively obtained using Pmax and Pmin so as to be closer to the actual hydraulic pressure as shown in FIG. 12. As a result, the braking pressures can be obtained using Px irrespective of no provision of the braking pressure sensors. On the other hand, in the final-mentioned embodiment, the opening time (tL) of the solenoid valve is detected and the hydraulic pressure after a given time is obtained on the basis of the initial value in accordance with the above-mentioned equation (21). Thus, one important difference of the final-mentioned embodiment with respect to the second-mentioned embodiment is to estimating the hydraulic pressure from the opening time of the solenoid valve. This difference provides an advantage that, because of using the output signal from the braking control unit to the braking solenoid valve, it is possible to separate the steering control unit from the braking control unit. This does not require the change of the braking control unit for the steering control unit.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A control system for use in a motor vehicle with two pairs of left and right wheels, comprising:
a braking control device for independently controlling braking pressures for at least one of said pairs of left and right wheels, said braking control device including:
braking actuator means for adjusting braking pressures to be applied to said pair of left and right wheels in response to braking control signals;
wheel sensor means for sensing rotation speeds of said pair of left and right wheels and generating signals indicative of the sensed rotational speeds thereof;
target braking pressure determining means for determining target braking pressures for said pair of left and right wheels on the basis of said rotational speed signals from said wheel sensor means; and
braking pressure control means for outputting said braking control signals to said braking actuator means so that the braking pressures for said pair of left and right wheels assume the determined target braking pressures, respectively; and
a steering control device for controlling the steering of said pair of left and right wheels in connection with the braking control performed by said braking control device, said steering control device including:
steering actuator means for adjusting steering angles of said pair of left and right wheels in response to steering control signals; and
steering angle control means for determining the steering angles of said pair of left and right wheels on the basis of the braking pressures for said pair of left and right wheels and outputting said steering control signals indicative of the determined steering angles to said steering actuator means so that said pair of left and right wheels assume the determined steering angles, thereby canceling any yaw moment generated by said braking pressures applied to said pair of left and right wheels.

2. A control system as claimed in claim 1, further comprising braking pressure sensor means for sensing braking pressures applied to said pair of left and right wheels, and wherein said steering angle control means determines the steering angles on the basis of the difference between the braking pressures of said pair of left and right wheels sensed by said braking pressure sensor means.

3. A control system as claimed in claim 1, wherein said steering angle control means determines the steering angles of said pair of left and right wheels on the basis of the difference between the target braking pressures determined by said target braking pressure determining means.

4. A control system as claimed in claim 1, further comprising vehicle speed detection means for detecting a speed of said motor vehicle, and wherein said steering control means corrects the steering angles of said pair of left and right wheels on the basis of the detected vehicle speed.

5. A control system as claimed in claim 1, further comprising braking pressure sensor means for sensing braking pressures applied to said pair of left and right wheels, and wherein said steering angle control means determines the steering angles on the basis of the difference between the braking pressures of said pair of left and right wheels sensed by said braking pressure sensor means and the sum of the braking pressures thereof.

6. A control system as claimed in claim 1, wherein said steering angle control means determines the steering angles of said pair of left and right wheels on the basis of the difference between the target braking pressures determined by said target braking pressure determining means and the sum of the target braking pressures thereof.

7. A control system as claimed in claim 1, wherein said steering angle control means estimates the braking pressures applied to said pair of left and right wheels on the basis of said braking control signals outputted from said braking pressure control means and determines the steering angles of said pair of left and right wheels on the basis of the difference between the estimated braking pressures.

8. A control system as claimed in claim 1, wherein said braking actuator means comprises solenoid valves for adjusting the braking pressures for said pair of left and right wheels and said steering angle control means estimates the braking pressures applied thereto on the basis of the opening times of said solenoid valves.

9. A control system as claimed in claim 1, wherein said steering angle control means comprises:
means for determining a basic rear wheel steering angle on the basis of braking pressures for a front of said pairs of left and right wheels;
means for determining a vehicle speed coefficient value on the basis of a speed of said vehicle; and
means for outputting a rear wheel steering command value as one of said steering control signals when said front pair of wheels have a steered angle lens than a predetermined value, said rear wheel steering command value being output on the basis of said basic rear wheel steering angle and said vehicle speed coefficient value.

10. A control system as claimed in claim 1, wherein said steering angle control means comprises:
means for determining a basic rear wheel steering angle on the basis of a steering angle of a front of said pairs of left and right wheels and a speed of said vehicle;
means for determining a correction value on the basis of braking pressures of said front pair of wheels; and
means for outputting a rear wheel steering command value as one of said steering control signals when said steering angle of said front pair of wheels exceeds a predetermined value, said rear wheel steering command value being output on the basis of said basic rear wheel steering angle and said correction value.

11. A control system for use in a motor vehicle having a front and rear pair of left and right wheels, comprising:
anti-skid braking system means for independently controlling braking pressures for the left and right wheels of at least one of said pairs of wheels during braking operation so that slip ratios of said left and right wheels approach target slip ratios, respectively, said target slip ratios being determined by said anti-lock braking system means in response to rotational speeds of said left and right wheels;
means for obtaining a pressure difference between said braking pressures for said left and right wheels;

means for calculating a steering angle of said at least one pair of wheels in accordance with the obtained pressure difference so as to cancel a yaw moment, said yaw moment being generated by said motor vehicle due to a braking force difference caused by the pressure difference; and drive means for steering said at least one pair of wheels in accordance with the steering angle calculated by said calculating means.

12. A control system as claimed in claim 11, wherein said pressure difference obtaining means includes pressure sensor means for sensing the braking pressures for said left and right wheels and pressure difference calculating means for calculating said pressure difference between the sensed braking pressures for said left and right wheels.

13. A control system as claimed in claim 11, wherein said anti-lock braking system means comprises:

wheel spaced sensor means for sensing speeds of said left and right wheels;

setting means for setting target braking pressures for said left and right wheels on the basis of the sensed wheel speed; and adjusting means for adjusting the braking pressures for said left and right wheels so that the braking pressures therefor approach the target braking pressures set by said setting means, and wherein said pressure difference obtaining means calculates the pressure difference between the target braking pressures for said left and right wheels, respectively.

14. A control system as claimed in claim 11, further comprising vehicle speed detection means for detecting a speed of said motor vehicle, said calculating means correcting the steering angle on the basis of the detected vehicle speed.

15. A control system as claimed in claim 11, further comprising means for calculating a sum of the braking pressures for said left and right wheels, and wherein said steering angle is calculated on the basis of the sum of the braking pressures and the pressure difference.

16. A control system as claimed in claim 11, wherein said anti-lock braking system means comprises:

wheel speed sensor means for sensing speeds of said left and right wheels;

adjusting means for independently adjusting the braking pressures for said left and right wheels in response to control signals; and control means for outputting said control signals to said adjusting means so as to control the braking pressures for said left and right wheels, said control signals being generated on the basis of said sensed wheel speeds, said pressure difference obtaining means calculating the pressure difference between the braking pressures for said left and right wheels on the basis of said control signals outputted from said control means.

17. A control system as claimed in claim 11, wherein said anti-lock braking system means includes solenoid valves for adjusting the braking pressures for said left and right wheels so as to estimate the braking pressures on the basis of the opening times of said solenoid valves.

18. A control system as claimed in claim 11, wherein said steering angle calculating means comprises:

means for determining a basic rear wheel steering angle on the basis of said pressure difference of said front pair of left and right wheels;

means for determining a vehicle speed coefficient value on the basis of a speed of said vehicle; and means for outputting a rear pair steering angle when said front pair of wheels have a steered angle less than a predetermined value, said rear pair steering angle being output on the basis of said basic rear wheel steering angle and said vehicle speed coefficient value.

19. A control system as claimed in claim 11, wherein said steering angle calculating means comprises:

means for determining a basic rear wheel steering angle on the basis of a steering angle of said front pair or left and right wheels and a speed of said vehicle;

means for determining a correction value on the basis of said pressure difference of said front pair of wheels; and means for outputting a rear pair steering angle when said steering angle of said front pair of wheels exceeds a predetermined value, said rear pair steering angle being output on the basis of said basic rear wheel steering angle and said correction value.

* * * * *